(12) United States Patent
Lai et al.

(10) Patent No.: US 12,308,677 B2
(45) Date of Patent: May 20, 2025

(54) BATTERY SYSTEM

(71) Applicant: PROTERRA POWERED LLC, Burlingame, CA (US)

(72) Inventors: David Lai, Redwood City, CA (US);
Dustin Grace, San Francisco, CA (US);
Derek R. Paul, Burlingame, CA (US);
Yale Chen, Burlingame, CA (US);
Cagkan Yildiz, Burlingame, CA (US)

(73) Assignee: PROTERRA POWERED LLC

(*) Notice: Subject to any disclaimer, the term of this patent is extended or adjusted under 35 U.S.C. 154(b) by 463 days.

(21) Appl. No.: 17/806,989

(22) Filed: Jun. 15, 2022

(65) Prior Publication Data

US 2022/0311257 A1    Sep. 29, 2022

Related U.S. Application Data

(63) Continuation-in-part of application No. 17/655,091, filed on Mar. 16, 2022, now abandoned.
(Continued)

(51) Int. Cl.
*H02J 7/00* (2006.01)
*B60L 50/64* (2019.01)
(Continued)

(52) U.S. Cl.
CPC .......... *H02J 7/00304* (2020.01); *B60L 50/64* (2019.02); *B60L 58/14* (2019.02); *B60L 58/18* (2019.02); *H01M 10/425* (2013.01); *H01M 10/613* (2015.04); *H01M 10/625* (2015.04); *H01M 10/6554* (2015.04); *H01M 50/204* (2021.01); *H01M 50/249* (2021.01);
(Continued)

(58) Field of Classification Search
CPC .... H02J 7/00304; H02J 7/0013; H02J 7/0031; H02J 7/00712; H02J 2207/20; H02J 2310/48; H02J 7/0014; B60L 50/64; B60L 58/14; B60L 58/18; B60L 2210/10; B60L 2240/549; B60L 3/0046; B60L 3/04; H01M 10/425; H01M 10/613; H01M 10/625; H01M 10/6554; H01M 50/204; H01M 50/249; H01M 50/583; H01M 2010/4271; H01M 2200/103; H01M 2220/20
USPC ........................................................ 320/162
See application file for complete search history.

(56) References Cited

U.S. PATENT DOCUMENTS 9,887,053 B2 *  2/2018  Zulim ................. H01H 47/223
10,205,331 B2 * 2/2019  Jung .................... H01M 50/51
(Continued)

FOREIGN PATENT DOCUMENTS

CN    207559012 U  *  6/2018  ............. Y02E 60/10
CN    215220817 U  * 12/2021  .......... H01M 10/613
(Continued)

OTHER PUBLICATIONS

CN 207559012 U Machine Translation (2018).*

*Primary Examiner* — M Baye Diao
(74) *Attorney, Agent, or Firm* — SNELL & WILMER L.L.P.

(57) ABSTRACT

A battery system of an electric vehicle includes a plurality of battery packs. Each battery pack includes a plurality of battery cells enclosed within a housing. A battery management device is electrically connected to each of the battery packs and configured to control an electrical output of the plurality of battery packs.

18 Claims, 25 Drawing Sheets

Related U.S. Application Data

(60) Provisional application No. 63/162,416, filed on Mar. 17, 2021.

(51) Int. Cl.
  *B60L 58/14* (2019.01)
  *B60L 58/18* (2019.01)
  *H01M 10/42* (2006.01)
  *H01M 10/613* (2014.01)
  *H01M 10/625* (2014.01)
  *H01M 10/6554* (2014.01)
  *H01M 50/204* (2021.01)
  *H01M 50/249* (2021.01)
  *H01M 50/583* (2021.01)

(52) U.S. Cl.
  CPC ......... *H01M 50/583* (2021.01); *H02J 7/0013* (2013.01); *H02J 7/0031* (2013.01); *H02J 7/00712* (2020.01); *B60L 2210/10* (2013.01); *H01M 2010/4271* (2013.01); *H01M 2200/103* (2013.01); *H01M 2220/20* (2013.01); *H02J 2207/20* (2020.01)

(56) References Cited

U.S. PATENT DOCUMENTS

| | | | |
|---|---|---|---|
| 10,790,554 B2* | 9/2020 | Eom | H01M 50/569 |
| 11,417,932 B2* | 8/2022 | Tang | H01M 50/249 |
| 2017/0005371 A1* | 1/2017 | Chidester | H01M 50/20 |
| 2019/0152342 A1* | 5/2019 | Shen | B60L 50/64 |
| 2021/0221213 A1* | 7/2021 | Maskew | H01M 10/425 |

FOREIGN PATENT DOCUMENTS

| | | | | |
|---|---|---|---|---|
| KR | 20210108148 A | * | 9/2021 | H02H 7/18 |
| WO | WO-2017023869 A1 | * | 2/2017 | B60L 50/66 |

* cited by examiner

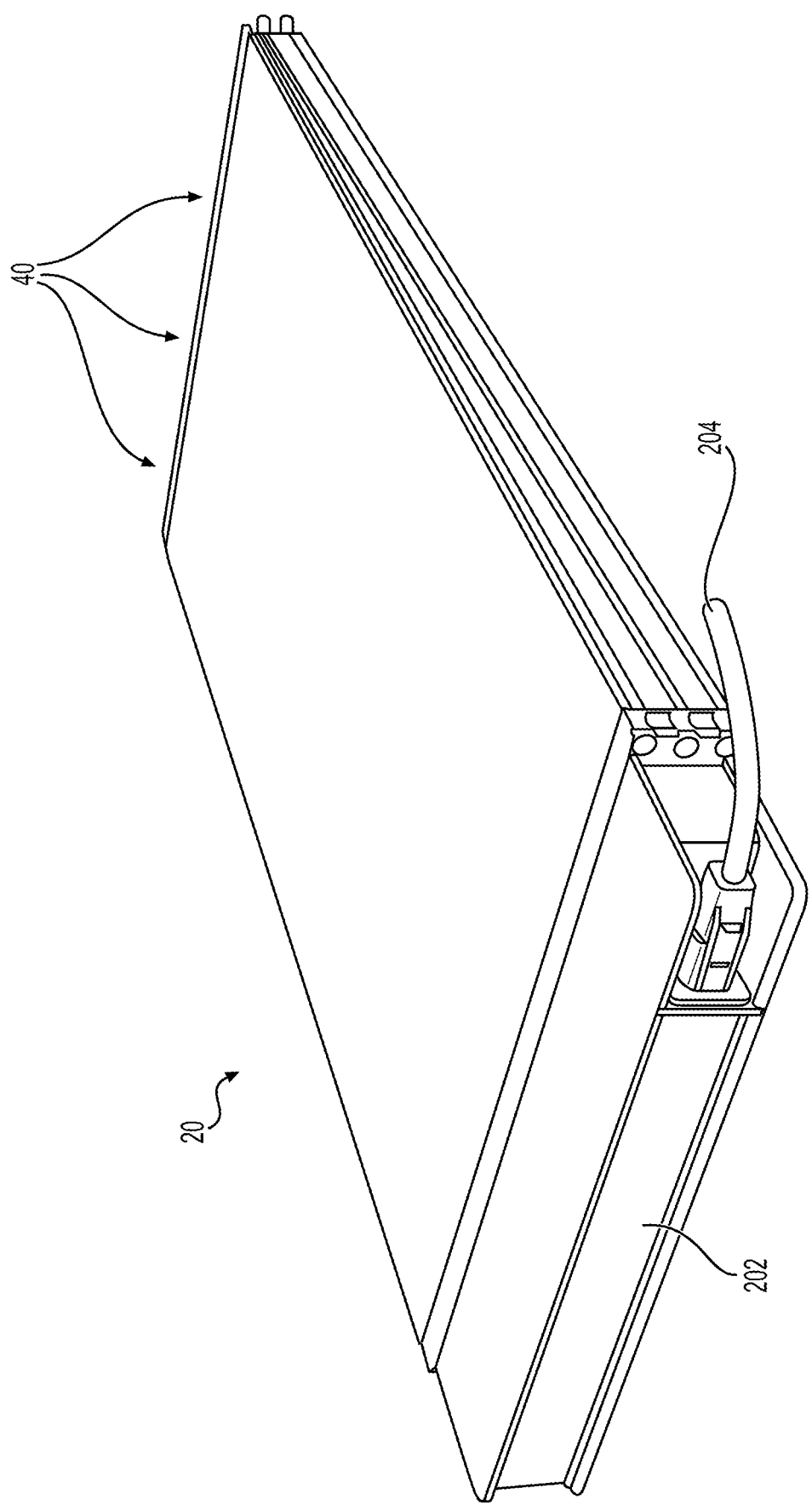

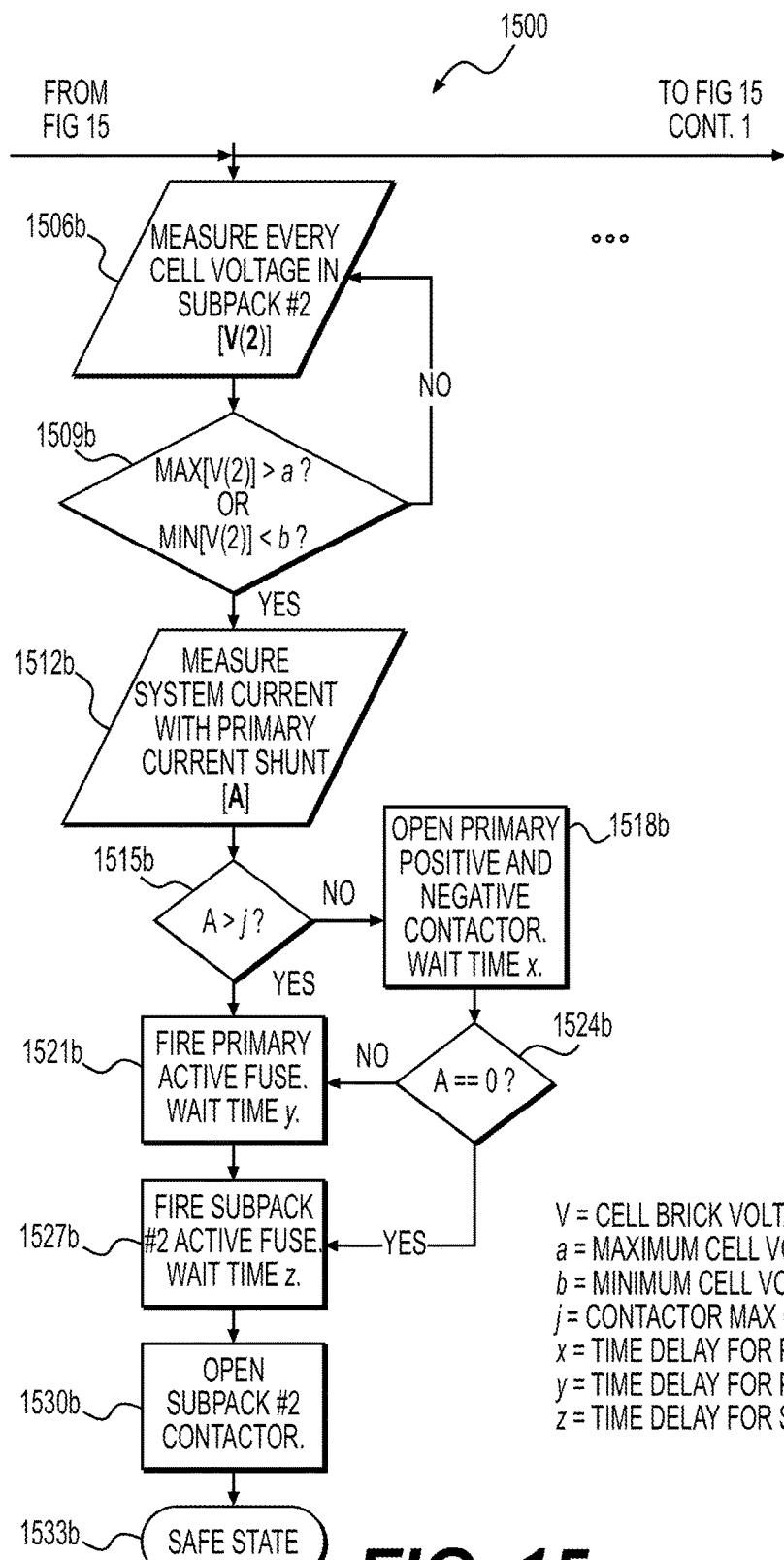
FIG. 15 (CONT. 1)

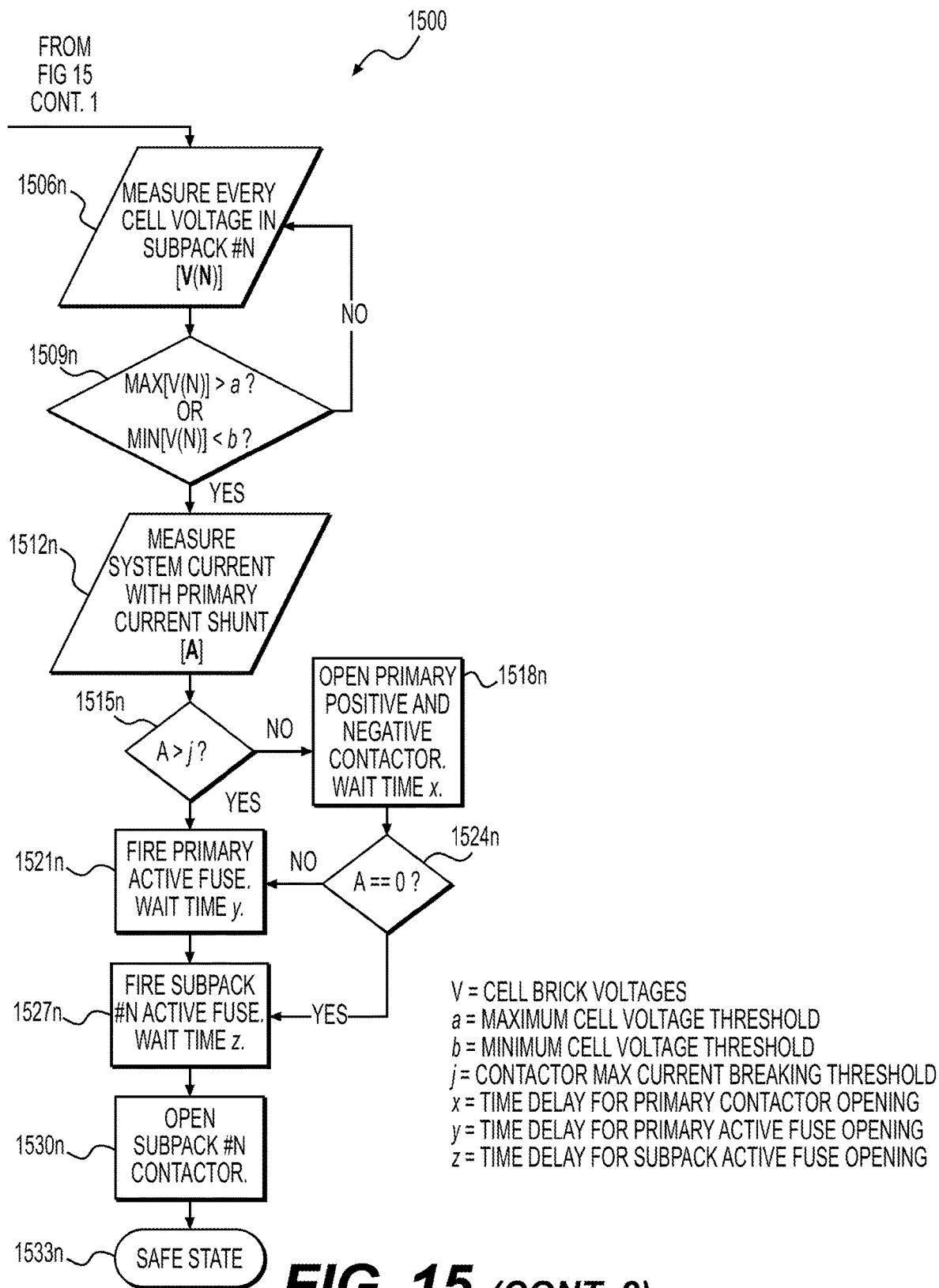
FIG. 15 (CONT. 2)

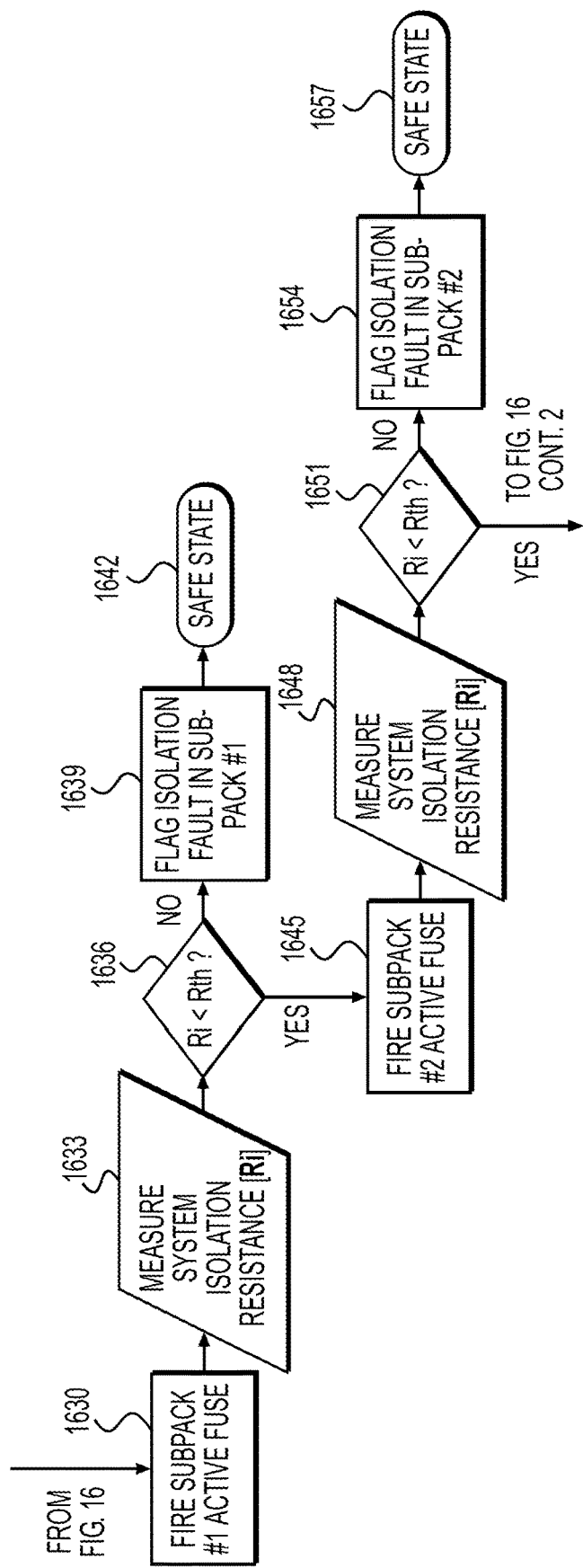
FIG. 16 (CONT. 1)

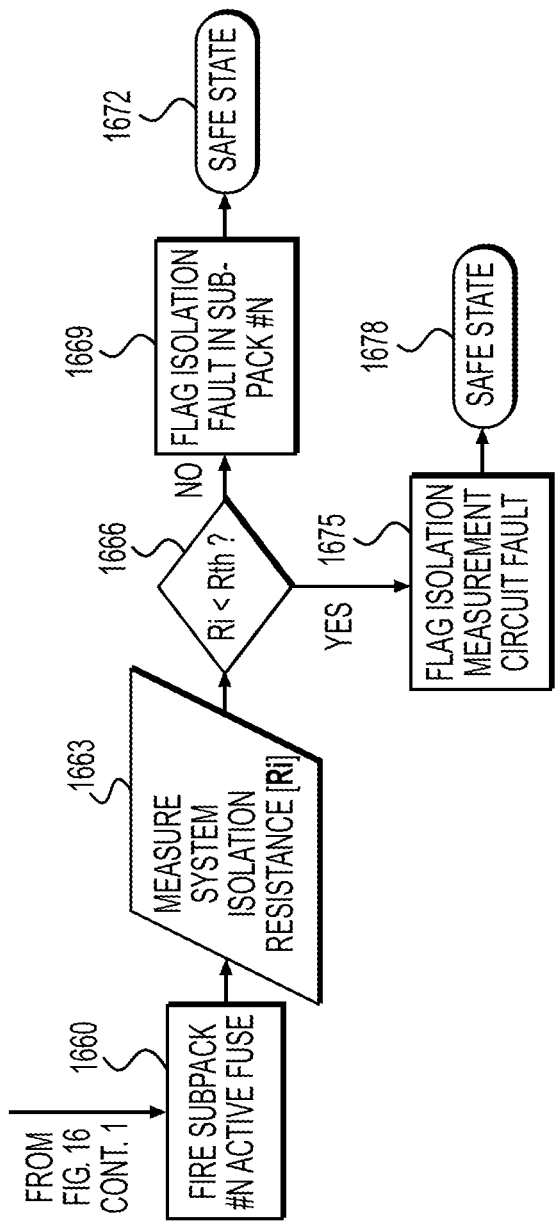
FIG. 16 (CONT. 2)

BATTERY SYSTEM

CROSS-REFERENCE TO RELATED APPLICATIONS

This patent application is a continuation-in-part of U.S. application Ser. No. 17/655,091, filed Mar. 16, 2022, which claims the benefit of priority to U.S. provisional Patent Application No. 63/162,416, filed on Mar. 17, 2021, the entirety of all of which are incorporated herein by reference.

TECHNICAL FIELD

Embodiments of this disclosure relate to battery systems.

BACKGROUND

An electric vehicle (EV), also referred to as an electric drive vehicle, may use an electric motor for propulsion. Electric vehicles may include all-electric vehicles in which an electric motor is the sole source of power, and hybrid-electric vehicles that include an auxiliary power source in addition to the electric motor. In an electric vehicle, energy may be stored in a rechargeable battery system that includes battery cells to power the electric motor. The battery system may typically include a plurality of battery packs that each include a plurality of battery modules. Each battery module may include battery cells. Battery packs may incorporate fixed-size battery modules as building blocks.

Battery packs may be challenging to incorporate as a power source for vehicles or for other applications due to their size. Battery packs built around fixed-size battery modules in particular may occupy a large volume and have relatively inflexible dimensions. Several battery packs may have to be combined to meet voltage and power requirements of certain applications, resulting in bulky battery systems with multiple battery packs occupying substantial physical space. Such battery packs may therefore impose significant design constraints for applications in which volume is at a premium, such as vehicular applications.

Embodiments of the current disclosure disclose battery systems that address some of the above-described limitations. The scope of the current disclosure, however, is defined by the attached claims, and not by the ability to solve any specific problem.

SUMMARY

Embodiments of the present disclosure relate to, among other things, battery systems for electric vehicles. Each of the embodiments disclosed herein may include one or more of the features described in connection with any of the other disclosed embodiments.

In one embodiment, a battery module may include a cooling plate defining a central plane of the battery module, the cooling plate having a first length; a first battery block adjacent to a first surface of the cooling plate, the first battery block including a first plurality of battery bricks positioned along the first surface of the cooling plate, each of the first plurality of battery bricks having a first plurality of battery cells oriented transversely to the first surface; and a second battery block adjacent to a second surface of the cooling plate, the second battery block including a second plurality of battery bricks positioned along the second surface of the cooling plate, each of the second plurality of battery bricks having a second plurality of battery cells oriented transversely to the second surface. An end of the cooling plate, an end of the first battery block, and an end of the second battery block may collectively define a first width of the battery module; and the first length may be greater than the first width.

In one embodiment, the first length is within a range from about 1700 mm to about 2700 mm and the first width is within a range from about 140 mm to about 240 mm.

In one embodiment, a ratio of the first length to the first width is within a range from about 8:1 to about 14:1

In another embodiment, a battery pack may include a plurality of battery modules, each battery module including a cooling plate defining a central plane of the respective battery module, a first battery block adjacent to a first surface of the cooling plate, and a second battery block adjacent to a second surface of the cooling plate. Each of the plurality of battery modules may be positioned adjacent at least one other of the plurality of battery modules such that the cooling plates are parallel and the battery pack may have a thickness ranging from about 50 mm to about 200 mm.

In one embodiment, wherein a battery pack has a thickness ranging from about 60 mm to 90 mm.

In one embodiment, the battery pack has a thickness ranging from about 125 mm to 155 mm.

In another embodiment, a battery cassette may include a plurality of cavities, each cavity including an a first opening at a first longitudinal end and a second opening at a second longitudinal end, at least one of the first opening and the second opening being configured to receive a battery cell; a positive terminal side configured to align positive terminals of battery cells disposed within the plurality of cavities; a negative terminal side configured to align negative terminals of battery cells disposed within the plurality of cavities; and one or more conductive elements extending from the positive terminal side to the negative terminal side.

In one embodiment, a body of the cassette is formed from an insulated material and the one or more conductive elements are embedded within the body of the cassette.

In one embodiment, one or more fasteners are disposed on one or more of the positive terminal side and the negative terminal side, the one or more fasteners configured to secure the battery cassette to a cooling plate. The one or more fasteners can be snaps.

In one embodiment, the plurality of cavities are arranged in a plurality of rows. Each row can be offset relative to an adjacent row.

In another embodiment, a cooling plate defining a central plane of the battery module; and a first plurality of battery bricks positioned along a first surface of the cooling plate. Each of the first plurality of battery bricks may include a plurality of battery cells oriented transversely to the first surface.

In one embodiment, a second plurality of battery bricks can be positioned along a second surface of the cooling plate.

In one embodiment, each of the second plurality of battery bricks includes a second plurality of battery cells oriented transversely to the second surface. The conductive foil can include a second positive conductive trace electrically connecting second positive terminals of the second plurality of battery cells on a second positive terminal side of the battery brick.

In another embodiment, a plurality of conductive traces can be included whereby each conductive trace extends from one of the one or more conductive elements to a longitudinal end of the one battery module.

In another embodiment, a battery pack may include a plurality of battery modules, each battery module including a cooling plate defining a central plane of the respective battery module, a first battery block adjacent to a first surface of the cooling plate, and a second battery block adjacent to a second surface of the cooling plate, wherein each of the plurality of battery modules is positioned adjacent at least one other of the plurality of battery modules such that the cooling plates are parallel; and a circuit board positioned at a longitudinal end of the battery pack. Each first battery block and each second battery block of the plurality of battery modules may be electrically connected to the circuit board.

In one embodiment, a plurality of conductive traces can be included connecting each first battery block and each second battery block of the plurality of battery modules to the circuit board.

In one embodiment, the circuit board receives voltage measurement information via the conductive traces.

In another embodiment, a battery system may include a plurality of battery packs, each battery pack including a plurality of battery cells enclosed within a housing and an electrical connector extending from the housing, wherein the electrical connector is electrically connected to each of the plurality of battery cells; and a battery management device electrically connected to each of the battery packs via the electrical connectors and configured to control an electrical output of the plurality of battery packs.

In another embodiment, the battery management device is configured to individually regulate in each battery pack one or more of a voltage, contactors, pre-charging loads, isolation monitoring, and a current supplied to the plurality of battery packs during charging.

In another embodiment, the plurality of battery packs are connected in parallel, and wherein each battery pack comprises a plurality of battery modules connected in series.

In another embodiment, the battery management device includes a low-voltage DC/DC converter configured to reduce a voltage of an electrical output of the plurality of battery packs.

In another embodiment, a high-voltage power distribution unit (HVPDU) contains the battery management device, the HVPDU including a housing and one or more active fuses (e.g., a pyro fuse), contactors, pre-charge hardware, current sensors for detecting high voltage loads in the electric vehicle.

In another embodiment, the HVPDU and the battery management device together regulate the electrical output of the battery packs.

In another embodiment, the HVPDU includes circuitry and logic for managing all vehicle high voltage and vehicle auxiliary loads, vehicle charging, and current between the battery management device and the battery packs.

In another embodiment, each battery pack includes a contactor, a plurality of battery cells, and an active fuse each connected in series, and wherein the active fuse of each battery pack is connected to a common primary active fuse of the HVPDU.

In another embodiment, the plurality of battery packs are connected in parallel, and wherein a contactor of each battery pack is connected to a pre-charge contactor and a primary contactor of the battery management device.

In another embodiment, the HVPDU includes a housing with a plurality of ports configured to electrically connect to the electrical connector of each battery pack.

In another embodiment, each battery pack can include at least one active fuse connected in series with battery cells and at least one contactor each of the battery pack, and the battery management device can include at least one primary active fuse, and wherein the at least one active fuse and the at least one primary active fuse is configured to actuate within a predetermined time of an overcurrent event.

In another embodiment, the battery management device is configured to passively balance each battery pack.

In another embodiment, each battery pack includes a voltage range of up to approximately 1000 V.

In another embodiment, a battery system of an electric vehicle includes a plurality of battery packs, each battery pack including a plurality of battery cells enclosed within a housing. Each battery pack includes an overcurrent protection device (e.g., an active overcurrent protection device such as an active fuse) and only one automatic disconnect device. A battery management device is included with a primary automatic disconnect device. The battery management device is electrically connected to each of the battery packs and configured to control an electrical output of the plurality of battery packs. The at least one overcurrent protection device and the only one automatic disconnect device are configured to actuate in response to an overcurrent event.

In another embodiment, the primary automatic disconnect device is a primary contactor connected in series with the plurality of battery packs, the primary contactor being configured to protect all of the plurality of battery packs.

In another embodiment, each battery pack includes a controller, a battery management board, a plurality of battery cells, and the overcurrent protection device connected in series with the battery cells and the primary contactor. In another embodiment, the overcurrent protection device is connected in series with the only one automatic disconnect device of the battery pack, and the battery management device includes at least one primary overcurrent protection device. The at least one overcurrent protection device and the at least one primary overcurrent protection device are configured to actuate in response to an overcurrent event.

In another embodiment, a capacity of each battery pack is at least approximately 40 kWh.

In another embodiment, each battery pack includes a charge time of less than approximately one hour.

In another embodiment, each battery pack includes a circuit board (e.g., within a circuit housing), and the circuit board is configured to connect at least 180 individual battery cells connected in series so that a peak system voltage permissible of each battery pack is approximately up to 1000 V. In some aspects, the circuit board can be a single node configured to measure (e.g., measure temperature, humidity, voltage, noise, etc.) and balance the individual battery cells.

In another embodiment, a length of each battery pack ranges range from approximately 500 mm to approximately 2700 mm.

In another embodiment, a thickness of each battery module within each battery pack includes a thickness ranging from approximately 75 mm to approximately 200 mm.

In another embodiment, a thickness of each battery module within each battery pack includes a thickness less than approximately 100 mm.

In another embodiment, each battery pack includes a cooling plate defining a central plane of a respective battery module, a first battery block adjacent to a first surface of the cooling plate; and a second battery block adjacent to a second surface of the cooling plate.

In another embodiment, each of the plurality of battery packs is positioned adjacent at least one other of the plurality of battery packs such that the respective cooling plates are parallel.

In another embodiment, the battery pack has a thickness ranging from about 50 mm to about 200 mm.

In another embodiment, each battery pack includes a plurality of battery modules. Each battery module can include a cooling plate defining a central plane of a respective battery module, a first battery block adjacent to a first surface of the cooling plate, and a second battery block adjacent to a second surface of the cooling plate, wherein each of the plurality of battery modules is positioned adjacent at least one other of the plurality of battery modules such that the cooling plates are parallel. A circuit board can be positioned at a longitudinal end of the battery pack. Each first battery block and each second battery block of the plurality of battery modules can be electrically connected to the circuit board.

In another embodiment, a plurality of conductive traces can be included for connecting each first battery block and each second battery block of the plurality of battery modules to the circuit board.

In another embodiment, a method is disclosed for controlling an electrical output of a plurality of battery packs of an electric vehicle (e.g., such as an electric bus). The method can include electrically connecting together a plurality of battery packs to a battery management device, each battery pack including a plurality of battery cells and an overcurrent protection device; and controlling, by the battery management device electrically connected to each of a plurality battery packs, the electrical output of the plurality of battery packs.

In another embodiment, the method can include connecting in series, in each battery pack, at least 180 individual cells so that a peak system voltage permissible of each battery pack is up to approximately 1000 V.

In another embodiment, the method can include actuating at least one primary active fuse of the battery management device and/or at least one overcurrent protection device of the battery packs in response to an overcurrent event.

In another embodiment, the method can include reducing, by a low-voltage DC/DC converter of the battery management device, a voltage of an electrical output of the plurality of battery packs.

In another embodiment, the method can include determining if a system current has exceeded a contactor maximum current threshold; and protecting, by a primary contactor of the battery management device, all of the plurality of battery packs by opening the primary contactor in response to determining if the system current has exceeded the contactor maximum current threshold.

In another embodiment, the method can include individually regulating, by the battery management device, a voltage of each battery pack and one or more automatic disconnect devices of each battery pack.

In another embodiment, the method can include individually regulating, by the battery management device, precharging loads and isolation monitoring in each battery pack.

In another embodiment, the method can include connecting the plurality of battery packs in parallel, and each battery pack comprises a plurality of battery modules connected in series.

In another embodiment, each battery pack includes only one automatic disconnect device.

In another embodiment, the method can include passively balancing, by the battery management device, each battery pack.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. Each of the embodiments disclosed herein may include one or more of the features described in connection with any of the other disclosed embodiments.

FIG. 4 is a perspective view of a battery pack according to the present disclosure.

DETAILED DESCRIPTION

The present disclosure describes a battery system of an electric vehicle. While principles of the current disclosure are described with reference to a battery system of an electric vehicle such as an electric bus, it should be understood that the disclosure is not limited thereto. Rather, the battery systems of the present disclosure may be used in any application (electric machine, electric tool, electric appliance, electrified building or structure, energy storage, etc.).

In this disclosure, relative terms, such as "about," "substantially," or "approximately" are used to indicate a possible variation of ±10% in the stated value.

Any implementation described herein as exemplary is not to be construed as preferred or advantageous over other implementations. Rather, the term "exemplary" is used in the sense of example or illustrative.

Battery packs are notoriously bulky and may therefore be challenging to incorporate as a power source in many applications. For example, electric vehicle designers may by constrained by an overall size of the vehicle (i.e. a vehicle may not be infinitely large) and may therefore have difficulty dedicating space to very large battery packs suitable to meet the power demands of the vehicle. Additionally, battery packs may be shaped in such a way that when multiple battery packs are needed for an application, clustering the battery packs together in a centralized, bulky battery system may be virtually unavoidable. Moreover, battery packs and battery systems may include intricate circuitry and wiring, making adding or subtracting battery packs from a given battery system arduous and expensive and also increasing manufacturing costs. Accordingly, various embodiments of the present disclosure may provide solutions to these and other problems.

Figure 1A:
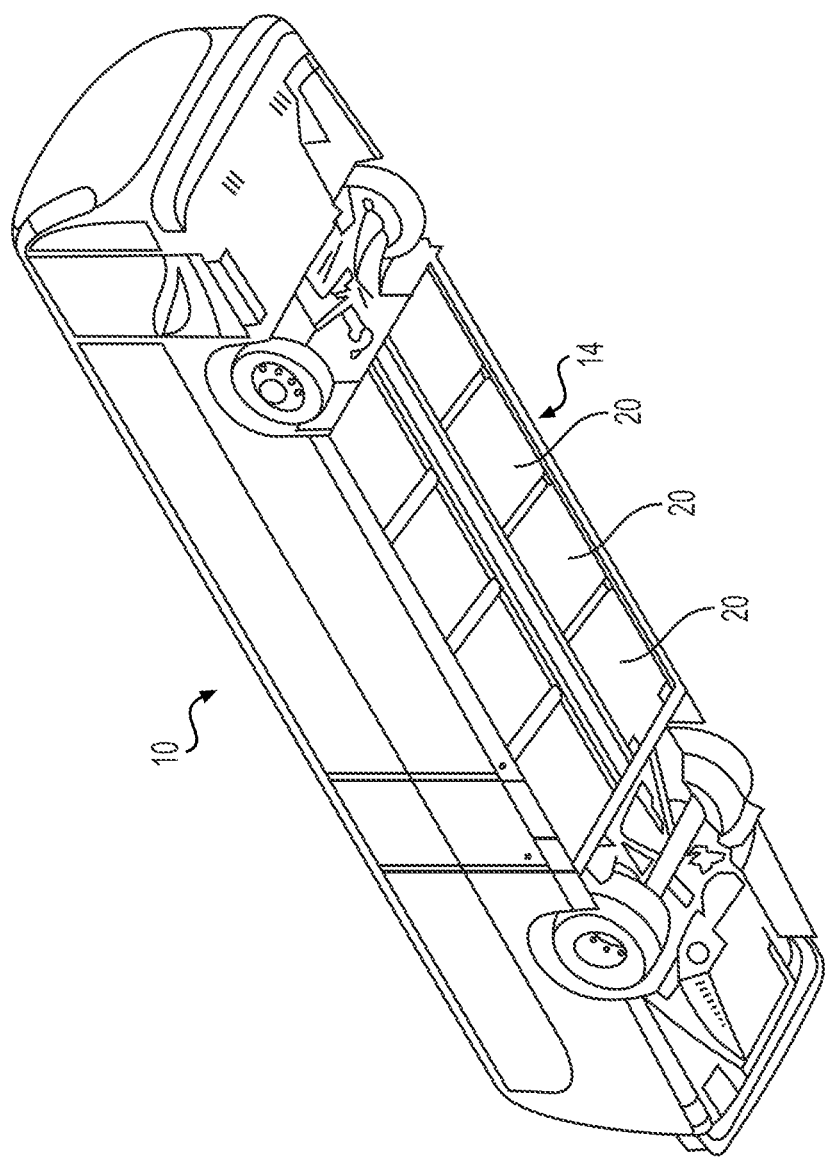
FIG. 1A illustrates an exemplary electric vehicle having a battery system according to some embodiments of the present disclosure.

FIG. 1A illustrates an electric vehicle 10 having a battery system 14. The battery system 14 may include a plurality of battery packs 20 positioned under the floor of the vehicle. Though shown as a bus in FIG. 1A, vehicle 10 may be any vehicle capable of utilizing battery power, including a bus, truck, car, train, work machine, farm equipment, or the like. Additionally, battery system 14 may be included in any electric vehicle, energy storage device, or another application. Although battery packs 20 are illustrated as being positioned under the floor of vehicle 10, as would be recognized by a person skilled in the art, battery packs 20 may be placed anywhere on the vehicle, including in a headliner, in a battery compartment, etc.

Figure 1B:
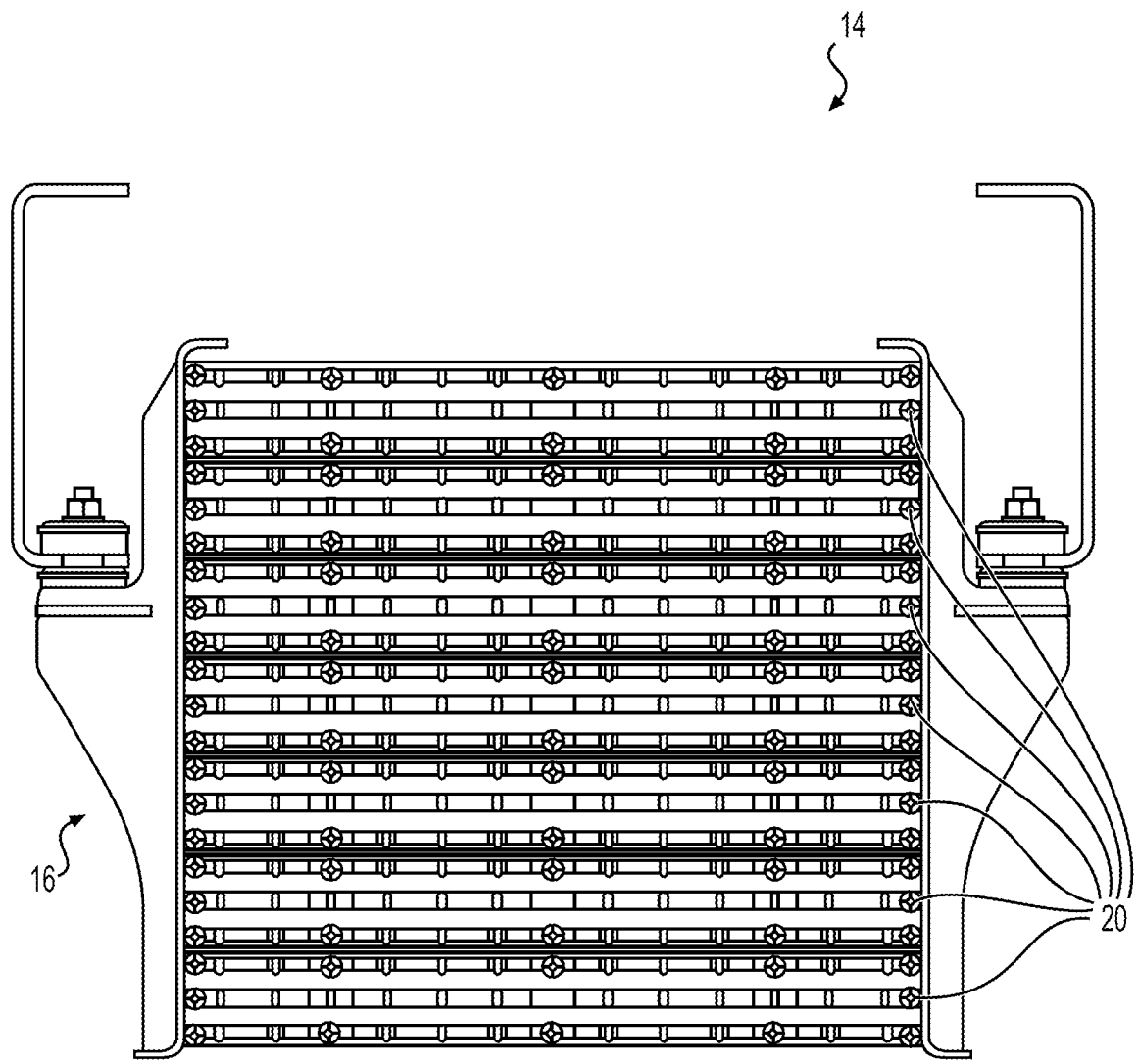
FIG. 1B illustrates an exemplary battery system according to the present disclosure.

FIG. 1B illustrates an exemplary battery system 14 with battery packs 20, according to some embodiments. As shown in FIG. 1B, battery packs 20 may be supported by a battery chassis 16. Battery chassis 16 may be configured to secure battery packs 20 to a vehicle. For example, battery packs 20 may be stacked vertically, as shown in FIG. 1B, within battery chassis 16 and secured in place. Battery packs 20 may alternatively or additionally be stacked horizontally. Battery packs 20 may be secured within battery chassis 16 by any suitable means, including by screws, bolts, adhesive, straps, or the like. Battery packs 20 may further be selectively secured within battery chassis 16 such that each battery pack 20 may be removed and/or replaced. Battery chassis 16 may be secured to vehicle 10 by attaching to a frame or chassis of vehicle 10, attaching to an interior of vehicle 10, or securing it at any other suitable location on vehicle 10. For example, battery chassis 16 may be attached to a frame or chassis of a vehicle and located between the wheels of the vehicle in some embodiments.

Each battery pack 20 may include one or more controllers (e.g., a subpack controller), a battery management board, and one or more battery cells connected together in parallel and in series, as described hereinafter in greater detail. Each battery pack 20 may include "an overcurrent protection device" (e.g., an active fuse such as a pyro fuse and/or a cell fuse) and may include only one automatic disconnect device, such as a contactor. It is understood that the term "automatic disconnect device" as used herein excludes circuit blocking. In some aspects, each battery pack 20 may not include any contactor though may include only one overcurrent protection device. The battery cells may be rechargeable battery cells having any suitable configuration (cylindrical, prismatic, etc.), and have any chemistry (lithium-ion, nickel cadmium, etc.). The battery cells may further be any standard battery cell, including 20700 lithium-ion battery cells, 21700 lithium-ion battery cells, 18650 lithium-ion battery cells, and the like. The battery cells may also be cylindrical and rechargeable. Though one battery chassis 16 is shown in FIG. 1B, it should be understood that vehicle 10 may include any number of battery chassis 16 suitable for securing a desired number of battery packs 20. The desired number of battery packs 20 may depend on projected power needs of vehicle 10 and/or any given application.

Figure 2:
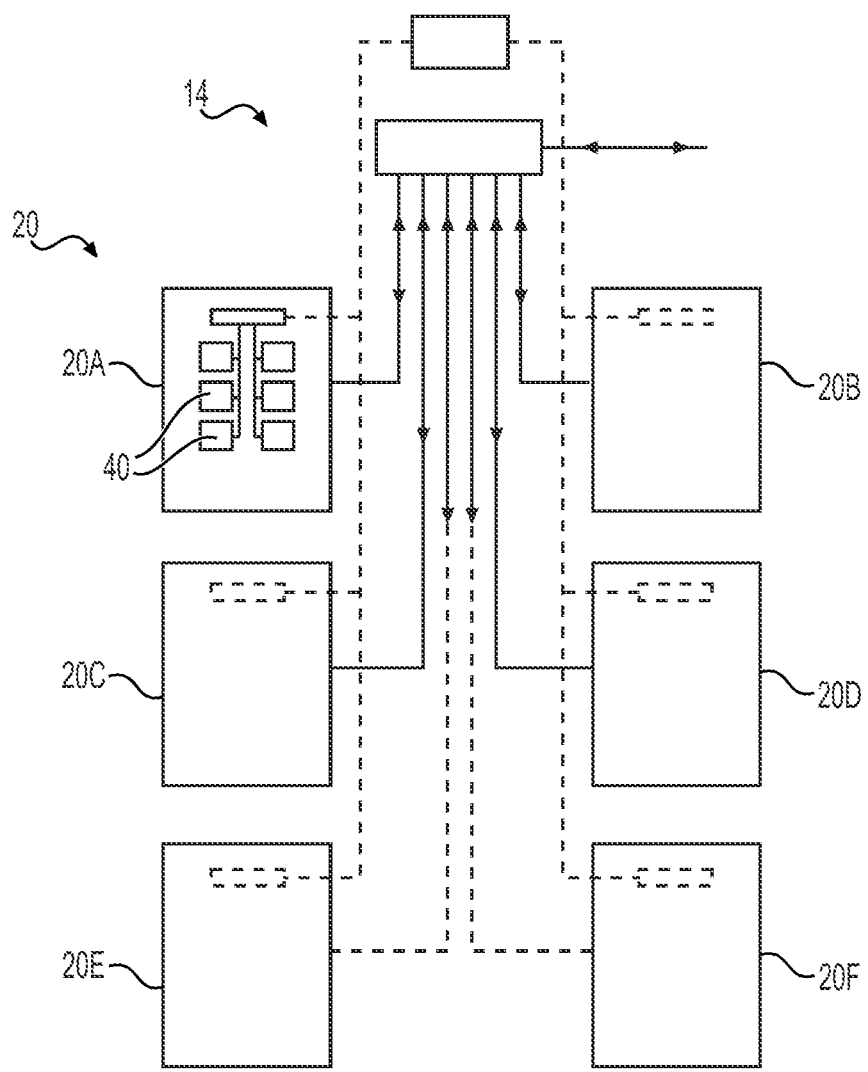
FIG. 2 is a schematic arrangement of battery packs in a battery system according to an exemplary embodiment.

FIG. 2 illustrates an exemplary configuration of battery system 14. In general, battery system 14 may include a plurality of battery packs 20 connected together in series and/or in parallel. FIG. 2 illustrates six battery packs 20A, 20B, 20C, 20D, 20E, and 20F (collectively referred to as battery packs 20) electrically connected to a junction in parallel. While six battery packs 20 are shown in FIG. 2, it should be understood that any number of battery packs 20 may be included in the battery system 14 (e.g., less than six such as four or five, or more than six such as ten or more). As shown in the illustration of battery pack 20A of FIG. 2, each battery pack 20 may include a plurality of battery modules 40. Each battery module 40 may include an enclosure that houses a plurality of battery cassettes ("cassettes") arranged to form battery bricks, and battery blocks. A cassette may include a plurality of battery cells electrically connected together. In some embodiments, multiple cassettes may form the battery module 40. As should be recognized by person having ordinary skill in the art, battery system 14 may include other components (controllers, fuses, etc.) that may not be described explicitly herein.

Figure 3:
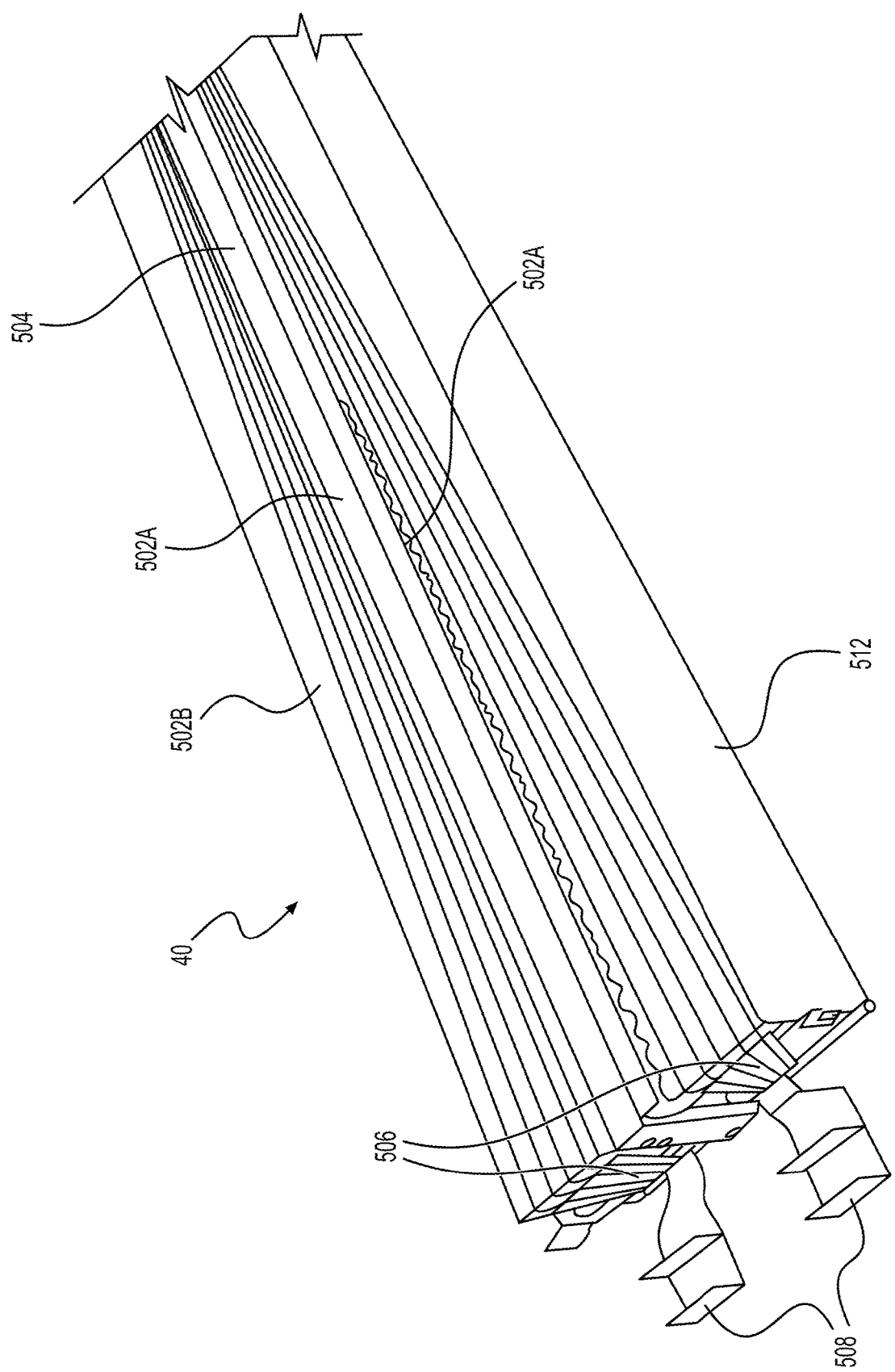
FIG. 3 illustrates an exemplary battery module according to the present disclosure.

FIG. 3 illustrates an exemplary battery module 40 of battery pack 20. In some embodiments, battery module 40 may include first and second battery blocks 502 positioned adjacent to a cooling plate 504. Battery block 502 may be attached to respective surfaces of cooling plate 504 using fasteners, adhesive, or other attachment mechanisms. In some embodiments, cooling plate 504 may include a cooling fluid conduit through which a cooling fluid (e.g., a liquid coolant) may be circulated. Cooling plate 504 may further define a central plane of battery module 40 and have a length greater than its height, as shown. Cooling plate 504 may additionally serve as a structural spine for battery module 40 and may assist in maintaining rigidity and/or structural integrity of battery module 40. Each battery block 502 may include a plurality of battery cells, each having a positive terminal and a negative terminal. For example, in some embodiments, each battery cell may be a cylindrical battery cell having a positive terminal and a negative terminal at opposite ends.

Referring to FIG. 3, each battery block 502 may include an inner surface 502A and an outer surface 502B. The battery cells of each battery block 502 may be arranged such that the negative terminals of each battery cell are aligned along inner surface 502A, and the positive terminals of each battery cell are aligned along outer surface 502B. Alternatively, the battery cells of each battery block 502 may be arranged such that the positive terminals of each battery cell a battery block 502 are aligned along inner surface 502A, and the negative terminals of each battery cell are aligned along outer surface 502B. The inner surface 502A of each battery block 502 may be arranged adjacent to a respective side surface of cooling plate 504 such that the battery blocks 502 are attached on opposite sides of cooling plate 504. In this configuration, like-charged terminals (i.e. positive or negative terminals) of battery cells in battery blocks 502 may be positioned proximate, or in physical or thermal contact with, side surfaces of cooling plate 504. In this configuration, the battery cells of battery blocks 502 may be cooled. In some embodiments, inner surface 502A of each battery block 502 may be flush with, or in physical contact with, the respective side surface of the cooling plate 504.

The battery cells of each battery block 502 may be arranged in parallel rows and oriented transversely to cooling plate 504. In some embodiments, the battery cells may be arranged in three parallel rows extending about the length of cooling plate 504. A height of the three rows of battery cells may be about the height of cooling plate 504. By orienting the battery cells in this manner, a height and width of each battery module 40 may be minimized whereas a length of each battery module 40 may generally be adjusted depending on a number of battery cells in each battery module 40. For a battery module 40 having more battery cells, the length may be increased. It is understood that the battery cells may be arranged in any number of parallel rows extending about the length of the cooling plate 504. For example, the battery cells may be arranged in one, two, and/or more than three parallel rows.

Moreover, by arranging the battery cells in battery module 40 in a small number of stacked rows, such as three rows as shown in FIG. 3, failure propagation may be minimized. In the event one battery cell within the battery module 40 is physically damaged, propagation of the failure may be constrained by the number of rows. For example, if a battery cell in the battery module 40 is punctured by a nail, thermal runaway may occur in neighboring battery cells. However, the thermal runaway may not be able to propagate beyond the three rows of battery cells of battery module 40, in contrast with other battery packs which may include battery cells arranged in dozens of adjacent rows.

As will be described hereinafter, groups of battery cells in each battery block 502 may be electrically connected in parallel to form battery bricks. As will also be described hereinafter, battery bricks may be electrically connected to one another in series via collector pins embedded within battery blocks 502 and a conductive foil 512 that extends along the length of the cooling plate 504. As will be described hereinafter, the conductive foil 512 may be positioned on the outer surface 502B of each battery block 502 to electrically connect the positive terminals of the battery cells included in each battery brick and to electrically connect the battery bricks in series. As shown in FIG. 3, the conductive foil 512 is positioned on the outer surface 502B such that conductive foil 512 may wrap around the top and bottom surface of the battery block 502. Collector pins may be distributed along a length of each battery block 502. Each collector pin may be electrically connected to a conductive trace 506, which may be included in the wrapped-around portion of the conductive foil 512 and may extend from a collector pin either along a top surface of one of the battery blocks 502 (as shown in FIG. 3) or along a bottom surface of one of the battery blocks 502. Traces 506 can extend length-wise to a singular node and be connected to battery management boards (BMB) of each battery pack 20

Traces 506 may be coupled to trace connectors 508. Trace connectors 508 may be positioned at a lateral end of battery module 40.

Each of battery blocks 502 may be positioned adjacent to a respective side surface of cooling plate 504. A lateral end of cooling plate 504 may include a conduit inlet and a conduit outlet. The conduit inlet and outlet may be in fluid communication with a cooling fluid conduit extending along the length of cooling plate 504. To prevent overheating of battery blocks 502 during operation, a coolant may be circulated into the conduit inlet, through the cooling fluid conduit, and out conduit outlet. It is understood that battery blocks 502 may be secured to a respective side surface of cooling plate 504 during the curing process by any additional or alternative suitable means, including by screws, bolts, straps, or the like.

Each battery brick in battery block 502 may similarly be arranged in series.

The energy or capacity of a battery block 502 may be determined by the number of cassettes used to form the battery block 502. That is, a battery block 502 formed using 10 cassettes (e.g., each cassette having 27 battery cells) may have a fixed energy based on the energy of each battery cell. The energy of the battery block 502 may be adjusted by changing the number of battery cassette included in the battery block 502. That is, adding cassettes to a battery block 502 may increase the energy of battery block 502 whereas removing cassettes from battery block 502 may decrease its energy. The voltage of a battery block 502 may be determined by the number of battery bricks that are connected in series in the battery block 502. In some aspects, the battery block 502 can include approximately 180 battery bricks in series so that the peak system voltage permissible of the battery block 502 can be up to approximately 1000 V. The energy storage capacity per block 502 can be approximately 40 kWh and/or up to approximately 500 kWh per battery system. It is understood that greater or fewer number of battery bricks are contemplated in the battery block 502, as needed or required. In some aspects, each battery block 502 can include at least one contactor (e.g., for galvanic isolation), one current sensor (e.g., +/−300 A per respective battery block 502), and/or one active fuse (e.g., for overcurrent protection). By changing the number of bricks in battery block 502, the voltage (and current) output of the battery block 502 may be changed.

In some embodiments, the voltage of the battery block 502 may be determined based on measurements obtained via conductive traces 506 (also referred to as measurement traces) described above with reference to FIG. 3. The conductive traces 506 may extend along a top surface of one of the battery blocks 502 (as shown in FIG. 3) or along a bottom surface of one of the battery blocks 502. In some embodiments, each conductive trace 506 may be electrically connected to a respective battery brick included in the battery block 502. For example, if there are 30 battery bricks included in battery block 502, there may be 31 conductive traces, each conductive trace 506 electrically connected to a separate battery brick. The conductive traces 506 of each battery block 502 may be coupled to a trace connector 508. The trace connector 508 of each battery block 502 may be coupled to a single circuit board as will be described in further detail below.

FIG. 4 depicts an example of a battery pack 20 having a portion of an outer housing removed. Battery pack 20 may include a plurality of battery modules 40. As shown in FIG. 4, battery pack 20 may include three battery modules 40 oriented such that the respective cooling plates 504 are parallel to each other and each battery module 40 is adjacent to another. Battery pack 20 may also include a circuit housing 202 enclosing a circuit board (described hereinafter) for battery pack 20. Battery pack 20 may further include an electrical connector 204 extending from circuit housing 202. Electrical connector 204 may comprise a single wire or cable with multiple cores, including a DC+ core and a DC− core. Electrical connector 204 may further serve as an electrical connection between the plurality of battery modules 40 within battery pack 20 and components outside of battery pack 20. Electrical connector 204 may incorporate additional features including isoSPI communication, CAN communication, high voltage interlock loop (HVIL). In some aspects, battery pack 20 may incorporate a manual electrical disconnect device with HVIL and an integrated active fuse.

Figure 5A:
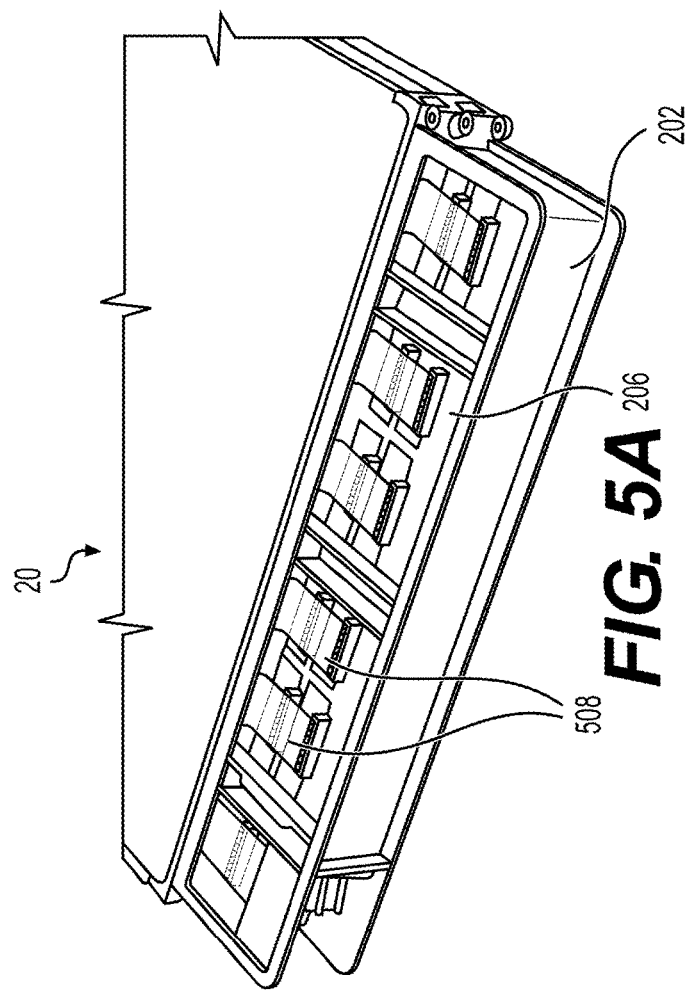
FIG. 5A is a perspective view of a battery pack and a circuit board according to the present disclosure.
Figure 5B:
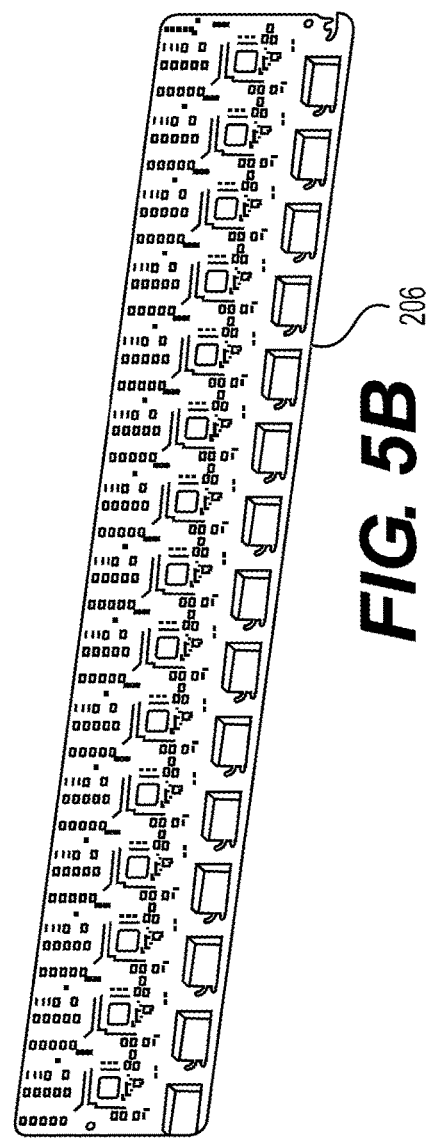
FIG. 5B is a perspective view of a circuit board for a battery pack according to the present disclosure.

FIGS. 5A and 5B depict a circuit board 206 for battery pack 20 in greater detail. As shown in FIG. 5A, battery pack 20 may include circuit board 206 within circuit housing 202. Circuit board 206 may be configured such that only one circuit board 206 may be sufficient to allow each battery module 40 within battery pack 20 to communicate with components outside of battery pack 20 via electrical connector 204. Trace connectors 508 for each battery module 40 of battery pack 20 may connect directly to circuit board 206, thereby connecting each individual battery cell of battery pack 20 to circuit board 206. Circuit board 206 may be configured to connect to any number of individual battery cells. In some embodiments, circuit board 206 may be configured to connect to 96 individual battery cells and in some embodiments circuit board 206 may be configured to connect to 180 individual battery cells, though circuit board 206 can be configured to connect to greater than or fewer than 180 individual battery cells, as needed or required. For a battery pack 20 having three modules 40 and six battery blocks 502, circuit board 206 may include connections for six trace connectors 508. In some embodiments, battery modules 40 may connect to circuit board 206 via flexible printed circuit (FPC) connectors. In some embodiments, battery modules 40 may connect to circuit board 206 via flexible flat cable (FFC) connectors.

In some embodiments, the circuit board 206 may include one or more voltage/current sensing components configured to measure the voltage/current of the battery modules. The measured voltage/current may be transmitted to a battery management device (e.g., battery management device 810 discussed hereinafter) via the electrical connector 204 as described herein. In some embodiments, the circuit board 206 may include additional measurement components, such as temperature and humidity sensing devices. Such measurement components may retrieve information from sensors distributed throughout the battery pack 20 and determine measurements based on the retrieved information. The determined measurements may be transmitted to the battery management device via the electrical connector 204 as described herein. In some embodiments, the circuit board 206 may include one or more temperature sensors. For example, the circuit board 206 may include more than 24 NTC thermistors. In some embodiments, the circuit board 206 may include a plurality of analog ports for additional sensors. In some embodiments, the circuit board 206 may be configured to dissipate excessive charge in individual battery cells within a respective battery pack 20. In some embodiments, the circuit board 206 may include one or more multicell battery stack monitoring integrated circuits.

Figure 6:
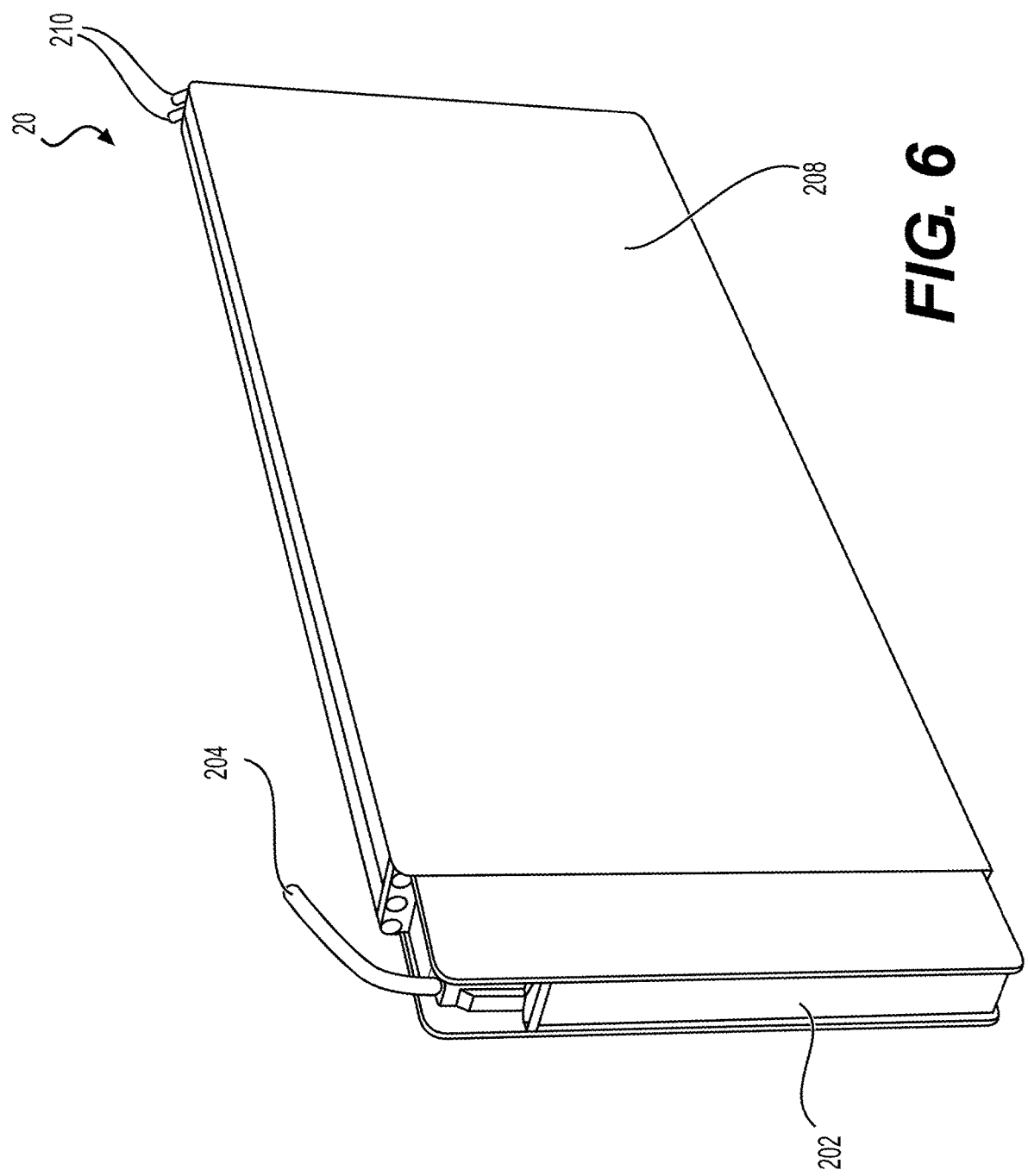
FIG. 6 is a perspective view of a battery pack according to the present disclosure.

As shown in FIG. 6, battery pack 20 may include a battery pack housing 208 enclosing the plurality of battery modules 40. Battery pack housing 208 may be made from any suitable material, including one or more metals, composites, aluminum, plastic, or the like. Battery pack housing 208 may also include one or more insulating layers. By way of example and without limitation, battery pack 20 with modules 40 may include a voltage range of approximately 450 to 1000 V (e.g., up to 1000 V) with a charge time of less than approximately one hour. Battery pack 20 may further include a plurality of coolant adaptors 210, which may be connected to a coolant source and a coolant drain, respectively. Coolant may be circulated from the coolant source through one of the coolant adaptors 210 by a pump, for example, to respective cooling plates 504 of each battery module 40 within battery pack 20. The coolant may then exit through another of the coolant adaptors 210 and be passed through a heat exchanger or the like to dissipate heat absorbed from battery modules 40 within battery pack 20.

Figure 7A:
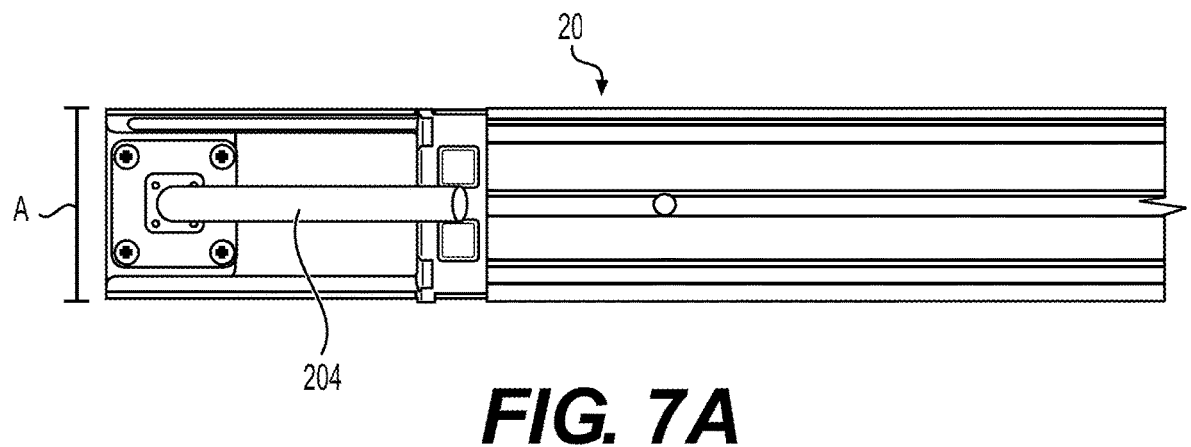
FIG. 7A is a side view of an exemplary embodiment of a battery pack according to the present disclosure.
Figure 7B:
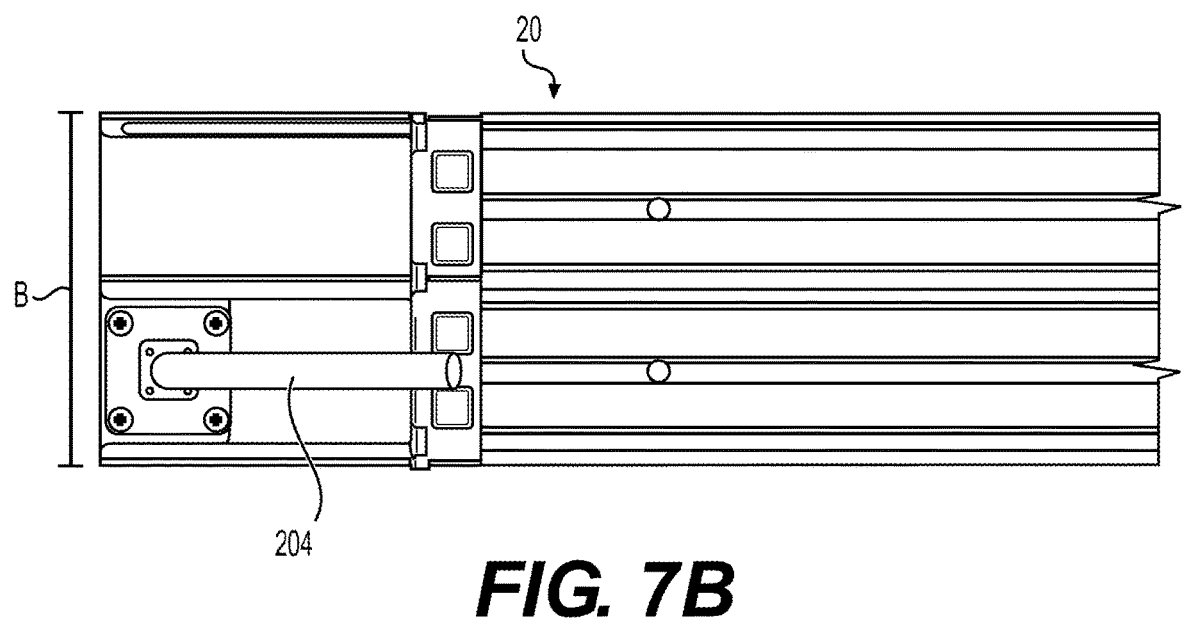
FIG. 7B is a side view of another exemplary embodiment of a battery pack according to the present disclosure.

By arranging battery cells within each battery cassette, each battery cassette within each battery block 502, each battery block 502 within each battery module 40, and each battery module 40 within each battery pack 20 as described herein, a relatively thin yet energy dense battery pack 20 may be formed. Moreover, a size of each battery pack 20 may be adjusted for specific applications. For example, FIGS. 7A and 7B illustrate exemplary embodiments of battery packs 20. As shown in FIG. 7A, battery pack 20 may have a thickness A, corresponding to a single layer of battery modules 40 enclosed within battery pack 20. In some embodiments, thickness A may range from about 75 mm to about 200 mm, may range from about 60 mm to about 90 mm, or may be about 75 mm. As shown in FIG. 7B, battery pack 20 may alternatively have a thickness B, corresponding to two layers of battery modules 40 enclosed within battery pack 20. Battery pack 20 may include two layers of battery modules 40 to effectively double a thickness and an energy capacity of battery pack 20. In some embodiments, thickness B may range from about 80 mm to about 200 mm, may range from about 125 mm to about 155 mm, or may be about 140 mm.

Length and width measurements of battery pack 20 may likewise be adjustable. For example, the length of battery pack 20 may be adjusted by adding or subtracting battery cassettes 702 to each battery block 502 of each battery module 40. For example, the length of battery pack 20 may range from about 500 mm to about 2700 mm in some embodiments. In some embodiments, the length may be about 780 mm. In some embodiments, the length may be about 1180 mm. In some embodiments, the length may be about 2180 mm. The width of the battery pack may range from about 300 mm to about 700 mm. In some embodiments, the width may be about 580 mm which is advantageous for horizontal and/or vertical loading in commercial vehicles. In some embodiments, the width of the battery pack 20 may be adjusted by adding or subtracting battery modules 40.

Figure 8:
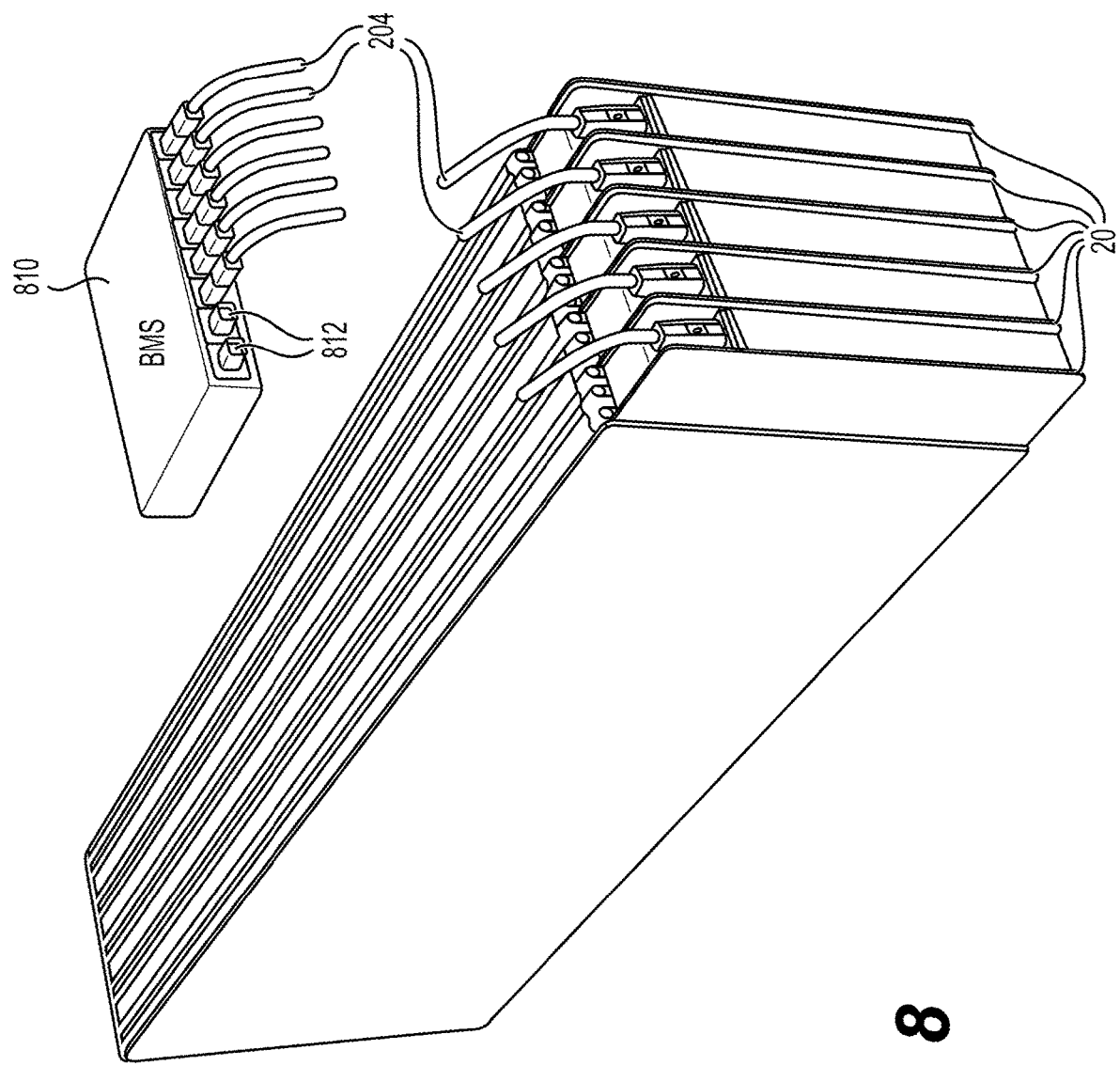
FIG. 8 is a perspective view of a battery system according to the present disclosure.

As shown in FIG. 8, dimensions of battery packs 20 may render them conveniently stackable, such as a stack of approximately five battery packs 20 as shown. For example, in some configurations, a plurality of battery packs 20 may be oriented adjacent each other as shown. The plurality of battery packs 20 may each include an electrical connector 204 extending therefrom. The electrical connectors 204 may each be configured to interface with a battery management device 810 (also referred to as a battery management system (BMS)) having a plurality of ports 812. In some aspects, a high-voltage power distribution unit (HVPDU) contains battery management device 810. The HVPDU can include a housing and one or more active fuses (e.g., a pyro fuse), contactors, pre-charge hardware, current sensors for detecting high voltage loads in the electric vehicle. In some aspects, the HVPDU can include a housing and function as a junction box and functioning as a battery disconnect unit.

In some aspects, the HVPDU can include circuitry and logic for managing battery management device 810 as well as managing functionality of the battery packs 20 via electrical connectors 204. For example and without limitation, such management can include power distribution, including all vehicle HV and vehicle auxiliary loads, charging, monitoring current (e.g., current sensors of HVPDU for an approximate range of +/−1500 A), controlling contactors, controlling pre-charging loads, perform isolation monitoring, perform high voltage measurements, and/or the like. This is particularly advantageous since, for example, this can remove the need for redundant hardware at every battery pack 20 (e.g., pre-charge hardware in each pack 20).

Battery management device 810 can include one more active fuses (e.g., one or more primary active fuses), contactors (e.g., primary contactors, fast-charge contactors, etc), other pre-charge hardware, and/or current sensors for high voltage loads in a corresponding vehicle (e.g., an exemplary current sensor of battery management device 810 can have an approximate range of +/−1500 A). Battery management device 810 can respond and manage faults in the battery system downstream thereof, including battery packs 20, as discussed more particularly below. In some embodiments, battery management device 810 may include a plurality of ports 812. Each port 812 may be configured to receive an electrical connector 204 from a battery pack 20. Battery management device 810 may include circuitry and logic for managing functionality of the battery packs 20 via electrical connectors 204, including power distribution functionality, charging functionality, monitoring current, controlling contactors, controlling pre-charging loads, perform isolation monitoring, perform high voltage measurements, and/or the like. In some aspects, battery management device 810 can be configured to monitor the above-referenced aspects individually in each pack 20.

In some aspects, battery management device 810 can be configured to communicate with a plurality battery packs 20 (e.g., up to 20 battery packs) over a controller area network (CAN bus). For example, battery management device 810 can be configured to provide a switched 24 V supply and/or source approximately 500 mA each to the plurality of battery packs 20. In some aspects, battery management device 810 can be configured to monitor cell voltages of each pack 20 with an accuracy of approximately 2 mV. In some aspects, battery management device 810 can be configured with a low power sleep state (e.g., less than 100 uA). Once in the low power sleep state, the battery management device 810 can be configured to wake upon receipt of an ignition and/or key signal and transition to a non-low power sleep state (e.g., an awake mode where the battery management device 810 monitors and/or otherwise regulates parameters of the battery packs 20).

In some aspects, battery management device 810 can be configured to monitor temperatures of each pack 20 with an accuracy of approximately +/−0.5 C. In some aspects, battery management device 810 can be configured to passively balance each pack 20 of the battery system, for example, with approximately 30 ohms of total resistance for each brick. In some aspects, battery management device 810 can be configured to consume less than approximately 500 mA of total current. In some aspects, battery management device 810 can be approximately 450 mm by 75 mm in dimensions.

In some aspects, battery management device 810 can be configured to monitor the above-referenced aspects individually in each pack. By having a centralized battery management device 810 capable of managing multiple battery packs 20, a need to include such controls (e.g., a control device per pack 20) for each individual battery pack 20 is obviated. In turn, complexity and cost of each battery pack 20 is advantageously reduced.

Each pack 20 and/or battery management device 810 can include one or more signal emitters to transmit a signal from a respective pack 20 and/or battery management device 810 to a signal receiver (e.g., at a depot or to another pack 20 and/or any system communicatively coupled thereto). Any type of signal can be transmitted. In some instances, the transmitted signal may be unidirectional or bidirectional. Preferably, the signal may be transmitted wirelessly and examples of wireless signals may include, but are not limited to, radio-frequency (e.g., RFID) signals, Bluetooth, control-area-network (CAN) messages, or any other form of communication. A signal may be from the respective pack 20 and/or battery management device 810 when the pack 20 and/or battery management device 810 is within some proximity of a location (e.g., a charging station) or encounters some safety event (e.g., overcurrent, thermal runaway, etc.) or at some predetermined power operational parameter (e.g., a state-of-charge or that the pack 20 is being charged and corresponding parameters). In some aspects, each pack 20 and/or battery management device 810 can include a tag ID that may be communicated in connection with the transmitted signal. In some embodiments, each pack 20 can have a unique tag ID to allow for easy identification and/or tracking.

Figure 9:
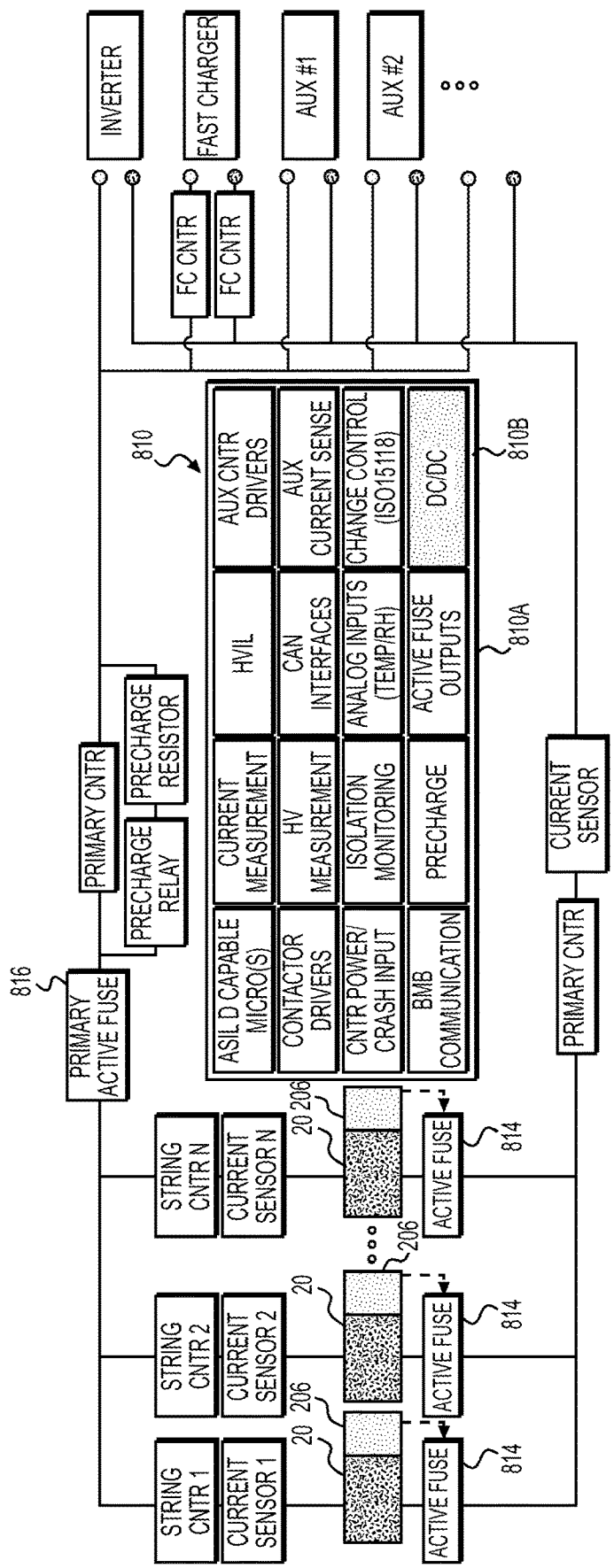
FIG. 9 is a schematic illustration of a battery system according to the present disclosure.

FIG. 9 illustrates an exemplary electrical schematic of a battery system according to the present disclosure. The battery system may include a plurality of battery packs 20 connected in parallel. Within each battery pack 20 may be a plurality of battery modules 40 connected in series. As shown, each battery pack 20 may include three battery modules 40. Each battery pack 20 may further include a circuit board 206, to which each battery module 40 is electrically connected. The parallel-connected battery packs 20 may be connected to battery management device 810, which may be responsible for managing the functionality of battery packs 20.

Via battery management device 810, battery packs 20 may be connected to vehicles, devices, or other components as desired. For example, battery management device 810 may include a controller which may regulate DC charging of battery packs 20 when connected to a power source. In some aspects, a charge controller can be plugged into or otherwise added in battery management device 810. Each pack 20 can include a respective controller to control operations of the respective pack 20, including but not limited to communicating a state-of-charge (SoC), state-of-health (SoH) pack related diagnostics, as well as other information such as pack shipment status, pack warranty related information, safety critical data (e.g., hours of operation, number of fast charges, fault history, and/or the like). In some aspects, one or more inverters, fast-charger interfaces (including with one or more corresponding fast-charge contactors), and/or auxiliary power interfaces can be positioned upstream of battery management device 810 and battery packs 20. In some aspects, battery management device 810 can include a low-voltage DC/DC converter to reduce the voltage of the output from each pack 20 without any automatic disconnect mechanisms. In such examples, each pack 20 excludes an automatic disconnect mechanism such as a pyro fuse and/or a contactor. Alternatively or in addition, each pack 20 can include its own low-voltage DC/DC converter that can be configured to power the respective pack 20.

Battery management device 810 may also include Vehicle-to-Grid (V2G) functionality, allowing battery packs 20 be connected to an ordinary electric grid for charging. Battery management device 810 may further include low voltage DC-DC conversion functionality, which may allow battery packs 20 to output both high voltage and low voltage for different applications. For example, drive motors in an electric vehicle may require high voltage whereas internal components, such as a radio, may require low voltage. By including such functionality within battery management device 810, battery packs 20 may be conveniently used for various applications.

The battery system, including battery management device 810, may further include a primary active fuse 816 connected in series with the plurality of battery packs 20. Each battery pack 20 may also include a plurality of active fuses 814. Active fuses 814 and primary active fuse 816 may be configured to interrupt the corresponding electrical circuit upon a particular trigger, such as an overcurrent event, as described more particularly in FIGS. 12-17 (e.g., the involvement of a vehicle containing the battery system in an accident). Upon detection of the trigger, each circuit board 206 and/or battery management device 810 may transmit a trigger signal to each respective active fuse 814 and primary active fuse 816. In response, the active fuses 814 and primary active fuse 816 may disconnect each of the battery packs 20 from the battery system, thereby preventing short circuiting and/or actuate (e.g., be fired), such as in overcurrent protection. It is understood that the active fuse(s) of this disclosure, including active fuses 814, 816 can include one or more active fuses configured to monitor current and upon detecting an overcurrent event, then interrupt the corresponding circuit. In some aspects, the active fuses 814 and primary active fuse 816 can be configured to activate within a predetermined time (e.g., approximately 4 ms) of an overcurrent event. In some aspects, primary active fuse 816 and active fuses 814 of respective packs 20 provides overcurrent safety redundancy.

In some aspects, as a secondary response, each battery pack 20 can be configured to respond to one or more faults between the respective battery pack 20 and battery management device 810. For example and without limitation, each battery pack 20 can be configured to include and open a respective contactor, actuate a respective active fuse (e.g., active fuse 814), and the like, so as to protect the battery system from faults that can occur in the HV cables between battery packs 20 and battery management device 810. Specific examples of such exemplary response embodiments are described in FIGS. 12-17. In this respect, in certain aspects active fuse 814 can be configured to actuate prior to any pack 20 removal. In some aspects, the contactor can be included in each battery pack 20 for galvanic isolation thereby ensuring that arcing and shock does not occur during handling. In this respect, battery packs 20 can include low relative energy and current (approximately 41 kWh, approximately 100 A continuous, respectively) with a leading energy density of approximately 200 Wh/kg for larger, commercial vehicle applications, as in the present disclosure.

Battery management device 810 may include a first battery management module 810A and a second battery management module 810B. First battery management module 810A and second battery management module 810B may be implemented as discrete circuit boards, for example, each including various integrated circuits depending on functionalities incorporated. In some embodiments, one or both of first battery management module 810A and second battery management module 810B may be removed or removable, allowing for selectivity of features included in first battery management module 810A and/or second battery management module 810B. In some embodiments, at least one of first battery management module 810A and second battery management module 810B may be omitted from the battery system. Such a configuration may offer desirable flexibility to users of the battery system shown in FIG. 9 to incorporate or omit certain features.

Battery management device 810 may be configured to interface with and/or manage the functionality of a certain number of battery packs 20 (e.g., 180 cells connected in series per respective pack 20). Battery management device 810 may interface with a plurality of battery packs 20 by communicating, for example, with respective circuit boards 206 for each battery pack 20. In some embodiments, battery management device 810 may be configured to interface with seven battery packs 20, however, it is to be understood that this disclosure is not so limited and battery management device 810 may interface with any number of battery packs 20 (e.g., four packs 20 as in FIG. 11B, five packs 20 as in FIG. 10 and FIG. 11A, six packs 20 as in FIG. 11C, etc.). Further, battery management device 810 can be configured to manage aspects of any number of battery packs 20 connected therewith, including parameters such as monitoring currents, pressure, Volatile organic compounds (VOCs), hydrogen, other gasses, humidity and/or temperatures, controlling one or more contactors, regulating pre-charging loads, performing isolation monitoring and high voltage measurements, and/or the like.

In some aspects, memory and functions can be distributed between battery management device 810, and/or subpack controllers of corresponding battery packs 20 thereby enabling each component in the system to be swapped in and out due to the modularity. For example, each battery pack 20 of FIG. 9 may include a battery management board (BMB) and a pack monitoring chip configured to monitor and/or regulate aspects of a respective battery pack 20, including but not limited to current, control of contactor(s), actuating active fuse 814 (e.g., in response to an overcurrent event), measure HV of battery pack 20, and/or the like. In some aspects, the BMB and respective pack monitoring chips can operate with 24V from battery management device 810. In some aspects, a replacement battery pack 20 can be swapped in the field as needed (e.g., in the event of pack failure). For example, one or more open primary contactors can be included with battery management device 810 so as to provide capability of removing and/or replacing the battery system from a corresponding vehicle in the field. In turn, data transfer requirements can be minimized as between subpack controllers and battery management device 810, and scalability improved due to the larger number of battery packs 20 individually regulated by battery management device 810. Such swappability is particularly advantageous for also adjusting other aspects of the battery system. In some aspects, the primary contactor of the battery management device 810 can be configured to protect all packs 20 connected thereto. At least one primary contactor can be connected in series with the plurality of battery packs 20.

In FIG. 9, active fuse 814 of each battery pack 20 can be connected in series with a current sensor and/or a primary contactor. The battery system may also include at least one pre-charge contactor and at least one primary contactor connected in series with the plurality of battery packs 20. In some aspects, each battery pack 20 can include at least one active fuse 814 connected in series with battery cells of the pack 20, a current shunt, and a contactor. While three packs 20 are shown in the topology of systems of FIG. 9, it is contemplated that any number of packs 20 (e.g., four, five, six, seven, eight, nine, ten, etc.) can be connected in parallel and regulated by battery management device 810. In some aspects, each battery pack 20 can include a current shunt, and a contactor. In some aspects, the contactor of each battery pack 20 enables a single isolation monitoring circuit at battery management device 810 thereby removing any need for a redundant isolation monitoring circuit at every battery pack 20.

For certain applications, a battery system may include a plurality of battery management devices 810 each interfacing with a plurality of battery packs 20. With such an application, the plurality of battery management devices 810 may, for example, be configured to communicate with each other over a controller area network (e.g., CAN bus). The plurality of battery management devices 810 may further communicate with an external control device and may appear to the external control device as a single device. For example, the plurality of battery management devices 810 may be configured according to a leader-follower architecture. Battery management device 810 of FIG. 9 can be configured to communicate with a plurality battery packs 20 (e.g., up to 20 battery packs) over a controller area network (CAN bus). For example, battery management device 810 can be configured to provide a switched 24 V supply and/or sourcing approximately 500 mA to the connected battery packs 20.

Figure 10:
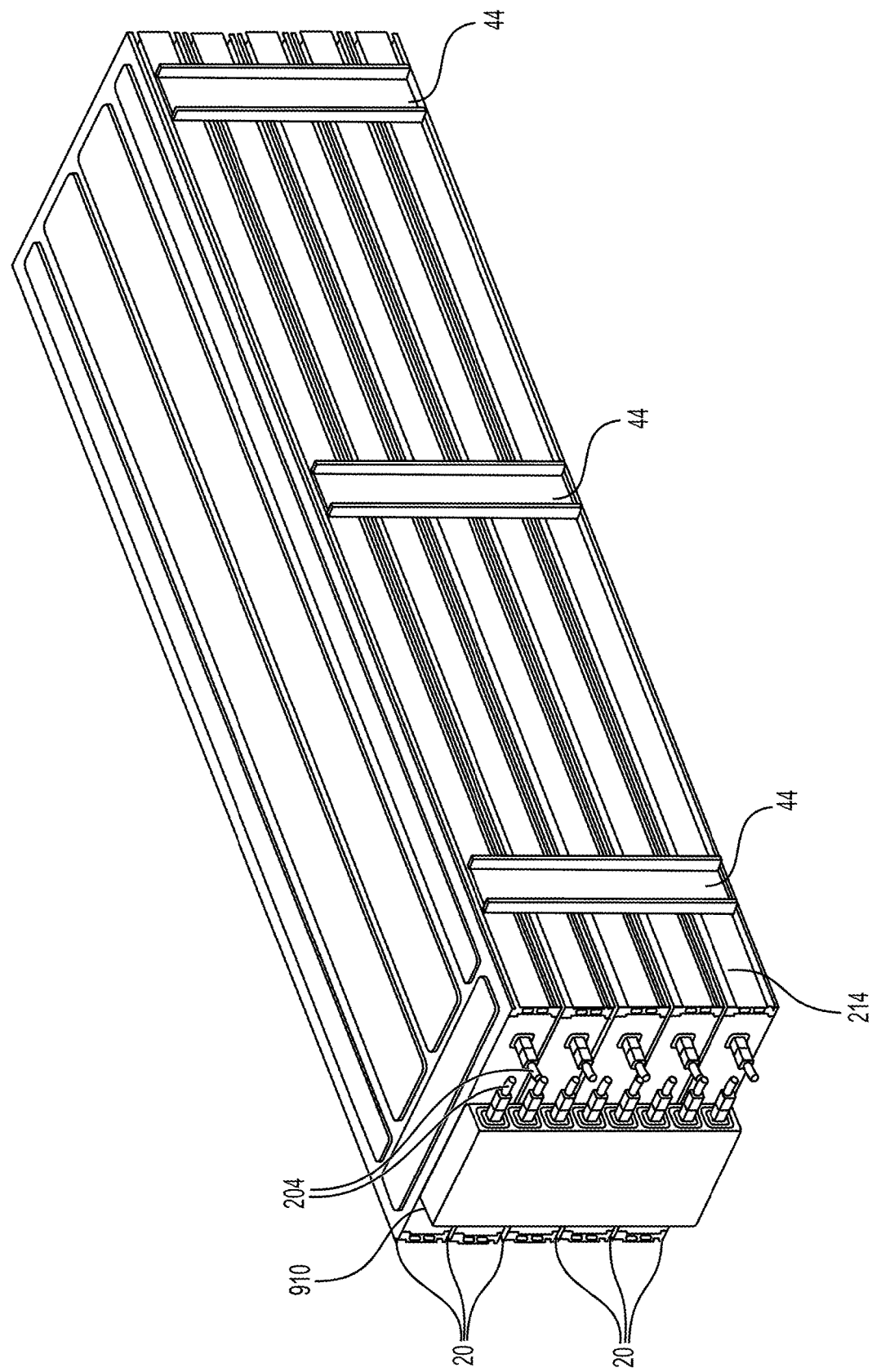
FIG. 10 is a perspective view of a battery system with an example battery management system according to the present disclosure.
Figure 11A:
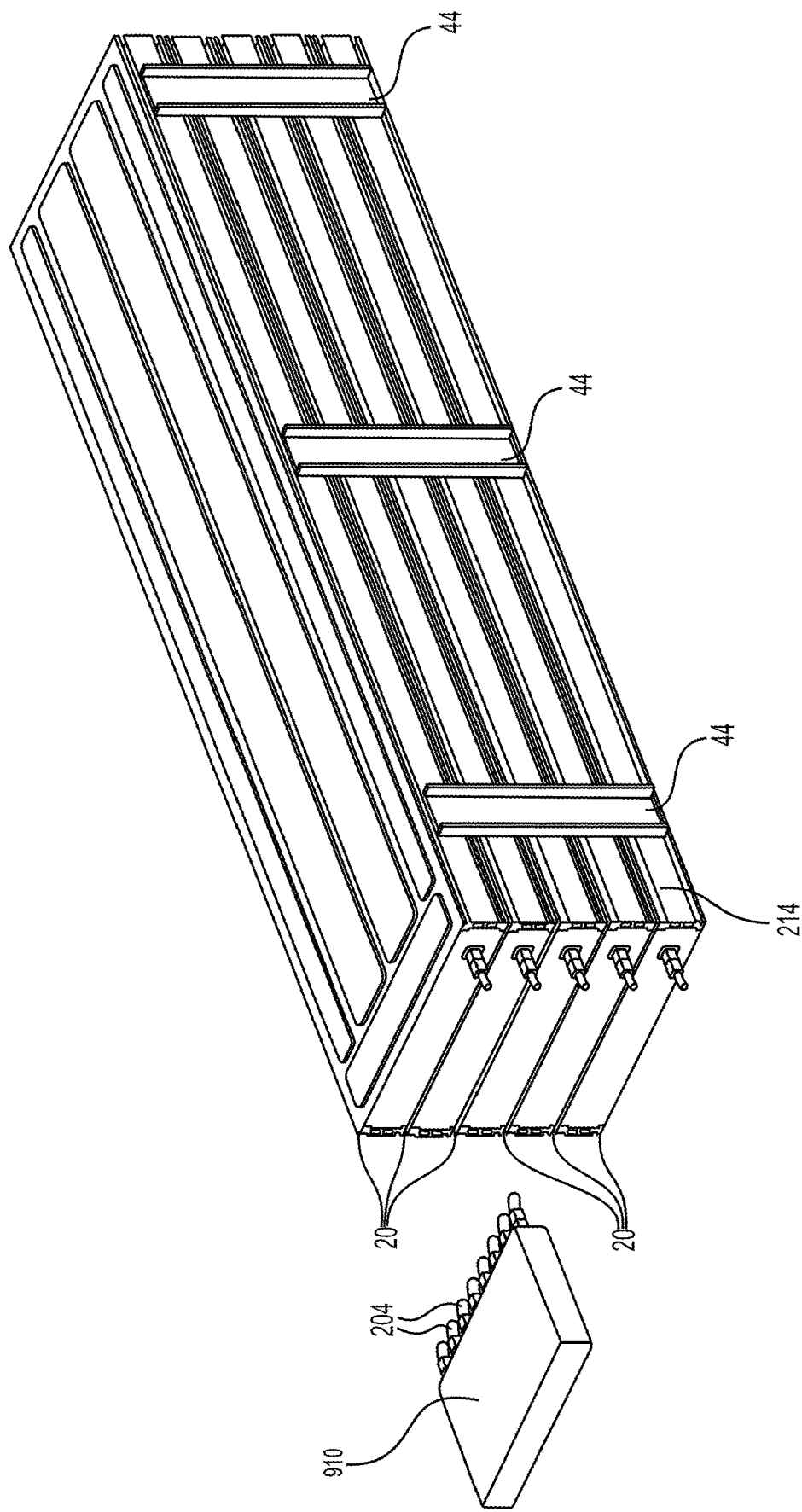
FIG. 11A is a perspective view of a battery system with an example battery management system according to the present disclosure according to an alternative embodiment.
Figure 11B:
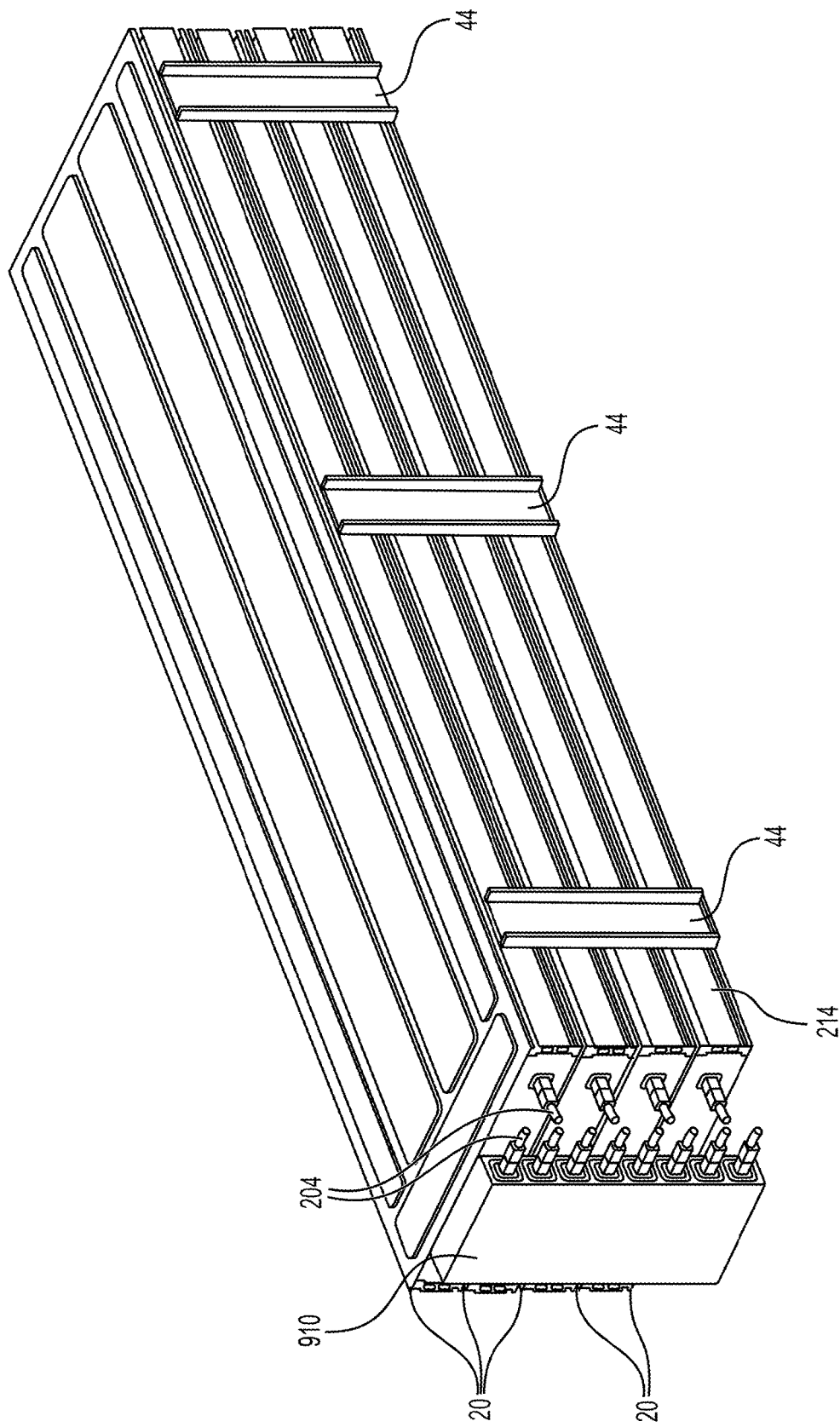
FIG. 11B is a perspective view of a battery system with an example battery management system according to another alternative embodiment.
Figure 11C:
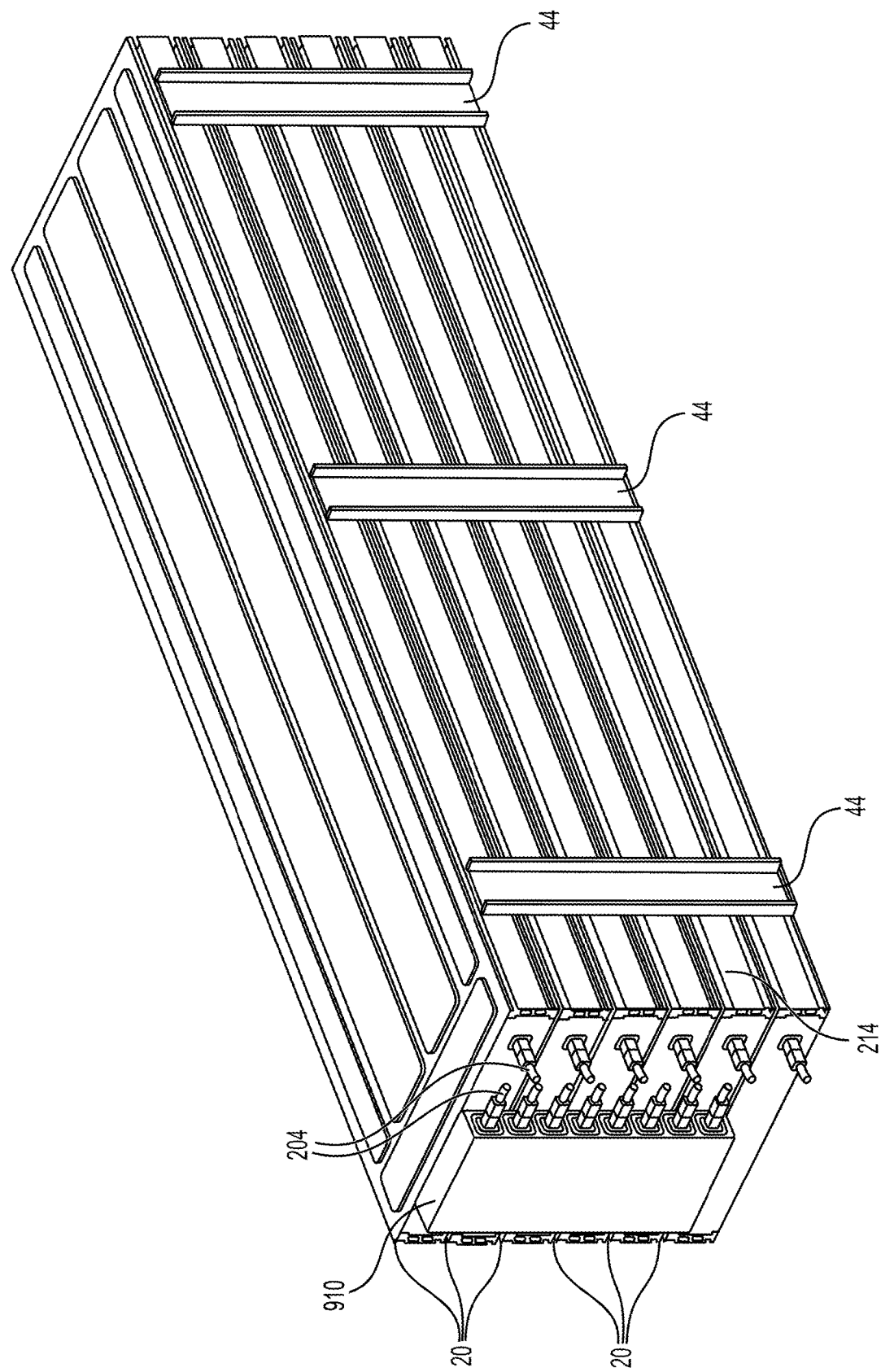
FIG. 11C is a perspective view of a battery system with an example battery management system according to the present disclosure according to an alternative embodiment.

FIG. 10 shows example battery management device 810 mounted to battery packs 20 (e.g., mounted to a forward face of battery packs 20). FIG. 11A shows another example battery management device 810 configured to be remotely mounted to battery packs 20. FIG. 11B shows an example of battery management device 810 similar to FIG. 10, but with four battery packs 20 stacked together. FIG. 11C shows an example of battery management device 810 similar to FIG. 10, but with six battery packs 20 stacked together. As shown in FIG. 10 to FIG. 11C, the plurality of battery packs 20 may be oriented adjacent each other. The plurality of battery packs 20 can include one or more mounting brackets 44 configured to couple battery packs 20 together. The plurality of battery packs 20 may each include at least one electrical connector 204 extending therefrom, as in previous examples, and the connectors 204 may each be configured to interface with ports of battery management device 810. Each port of battery management device 810 may be configured with touch safe housings and be configured to receive an electrical connector 204 from a respective battery pack 20.

Figure 12:
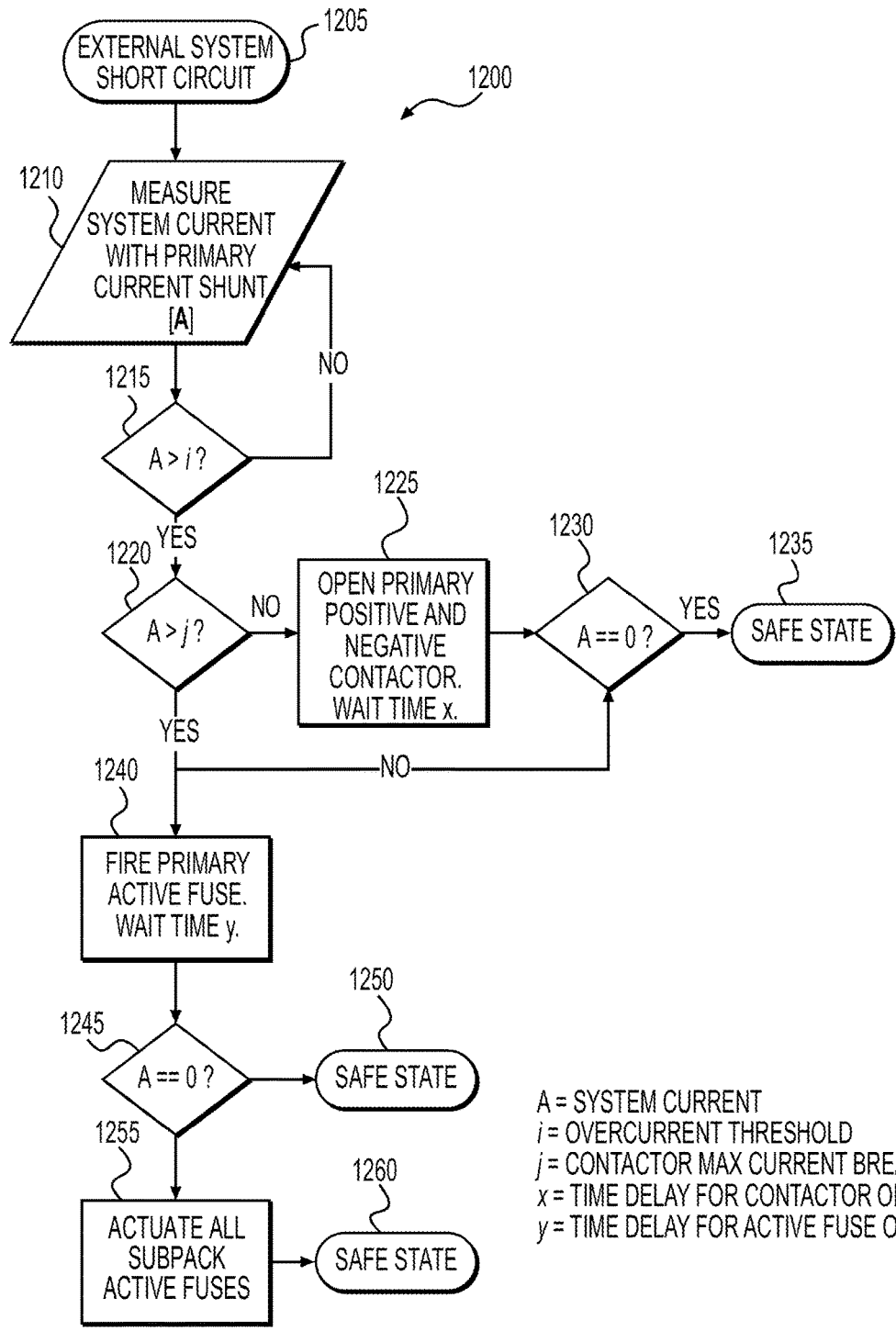
FIG. 12 is a flow chart illustrating an exemplary method of managing an external system short circuit according to an example embodiment.

FIG. 12 is a flow chart of an exemplary method 1200 using any of the herein described battery systems to manage an external system short circuit. In method 1200, an external system short circuit can occur (step 1205). As discussed herein, "an external system short circuit" can be understood as situations such as one or more short circuits across the terminals of the battery packs 20, inrush current when adding a battery pack 20 to the system, or any other system overload that exceeds short circuit protections of the battery system. System current may then be measured with a primary shunt (step 1210). In some aspects, the battery management device 810 may include the primary shunt of step 1210. The battery management device 810 may then determine whether the system current has exceeded an overcurrent threshold (step 1215). If it has not exceeded, the battery management device 810 may continue measuring system current with the primary current shunt, as in step 1210.

If the system current is determined to be greater than the overcurrent threshold, then the battery management device 810 may determine whether the system current has exceeded the contactor maximum current breaking threshold (step 1220). If the system current has not exceeded the contactor maximum current breaking threshold, then the battery management device 810 may open the primary positive and negative contactors (step 1225). In some aspects of step 1225, a time delay is contemplated for opening the primary positive and negative contactors. In some aspects, an exemplary time delay, such as but not limited to approximately 500 ms, is contemplated before resampling the system current to allow time for the primary positive and negative contactors to open. If the system current is determined to be zero (step 1230), then a safe state is considered to be present (step 1235) such that no further corrective action by battery management device 810 is required.

If the system current is determined to have exceeded the contactor maximum current breaking threshold, then the active fuse actuates (e.g., active fuse 816, which can be a primary pyro fuse) (step 1240). In some aspects of step 1240, a time delay is contemplated for opening the active fuse. A time delay (e.g., 10 ms) of step 1240 can be approximately 10 ms before resampling the system current to allow time for the active fuse to open the circuit. After actuating the active fuse, the battery management system can determine whether the system current is approximately zero (step 1245). If the system current is approximately zero, then a safe state is considered to be present (step 1250) such that no further corrective action by battery management device 810 is required. If the system current is not approximately zero, then all active fuses of the battery packs (e.g., one or more pyro fuses of each battery pack 20) are actuated (step 1255). Upon actuating all such active fuses, then a safe state is considered to be present (step 1260) such that no further corrective action by battery management device 810 is required.

Figure 13:
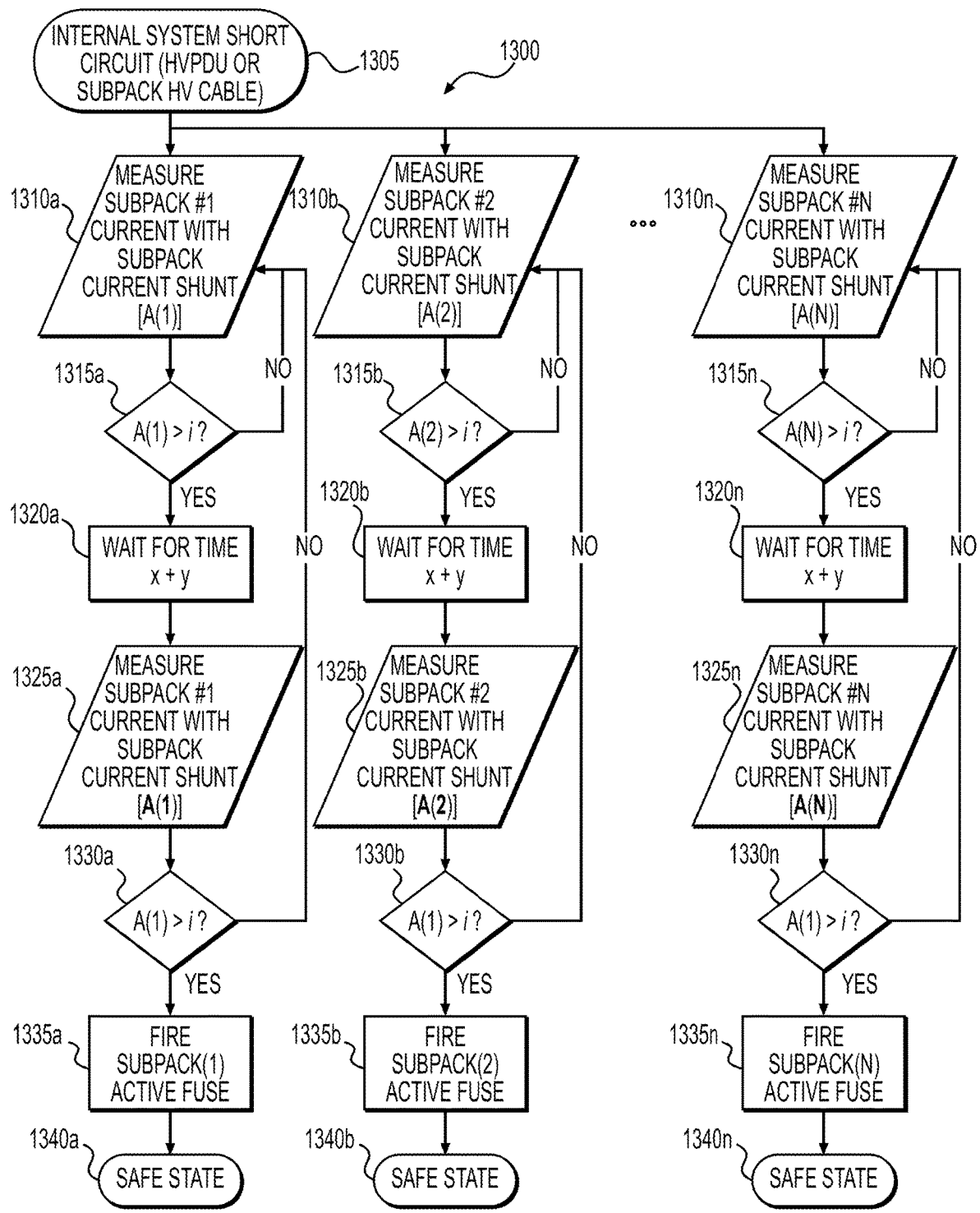
FIG. 13 is a flow chart illustrating an exemplary method of managing an internal system short circuit according to another embodiment.

FIG. 13 is a flow chart of an exemplary method 1300 using any of the herein described battery systems to manage an internal system short circuit (e.g., a short circuit at an HVPDU of battery management device 810 or in an HV cable of a battery pack 20). In method 1300, an internal system short circuit can occur (step 1305). A current shunt of a respective battery pack can measure the respective battery pack current (step 1310*a*, 1310*b*, 1310*n*). While three such battery packs 20 are shown in FIG. 13, it is understood any number of battery packs are contemplated for use with method 1300 and that "n" is intended to be any natural number of battery packs in the battery system of method 1300. The battery management device 810 may then determine whether the respective battery back current has exceeded a respective battery back overcurrent threshold (step 1315*a*, 1315*b*, 1315*n*). If it has not exceeded, the current shunt of the respective battery pack may continue measuring measure the respective battery pack current, as in step 1310*a*, 1310*b*, 1310*n*. In some aspects, the battery management board and/or pack monitoring chip of each pack may determine whether the respective battery pack current has exceeded the respective battery back overcurrent threshold, as in step 1310*a*, 1310*b*, 1310*n*.

If the respective battery pack current is determined to be greater than the respective battery back overcurrent threshold, then the battery system can wait a total time delay for the primary contactor and primary active fuse to open (step

1320*a*, 1320*b*, 1320*n*). After waiting the total time delay, the current shunt of the respective battery pack can repeat measuring the respective battery pack current (step 1325*a*, 1325*b*, 1325*n*). The battery management device 810 may then determine whether the respective battery back current has exceeded the respective battery back overcurrent threshold (step 1330*a*, 1330*b*, 1330*n*). If it has not exceeded, the current shunt of the respective battery pack may continue measuring measure the respective battery pack current, as in step 1310*a*, 1310*b*, 1310*n*. In some aspects, the battery management board and/or pack monitoring chip of each pack may determine whether the respective battery pack current has exceeded the respective battery back overcurrent threshold, as in step 1330*a*, 1330*b*, 1330*n*. If the respective battery pack current has exceeded the respective battery back overcurrent threshold, then one or more active fuses of the respective battery pack (e.g., one or more pyro fuses of each battery pack 20) are actuated (step 1335*a*, 1335*b*, 1335*n*). Upon actuating the one or more active fuses of the respective battery pack, then a safe state is considered to be present (step 1340*a*, 1340*b*, 1340*n*) such that no further corrective action by battery management device 810, the battery management board, and/or pack monitoring chip is required.

Figure 14:
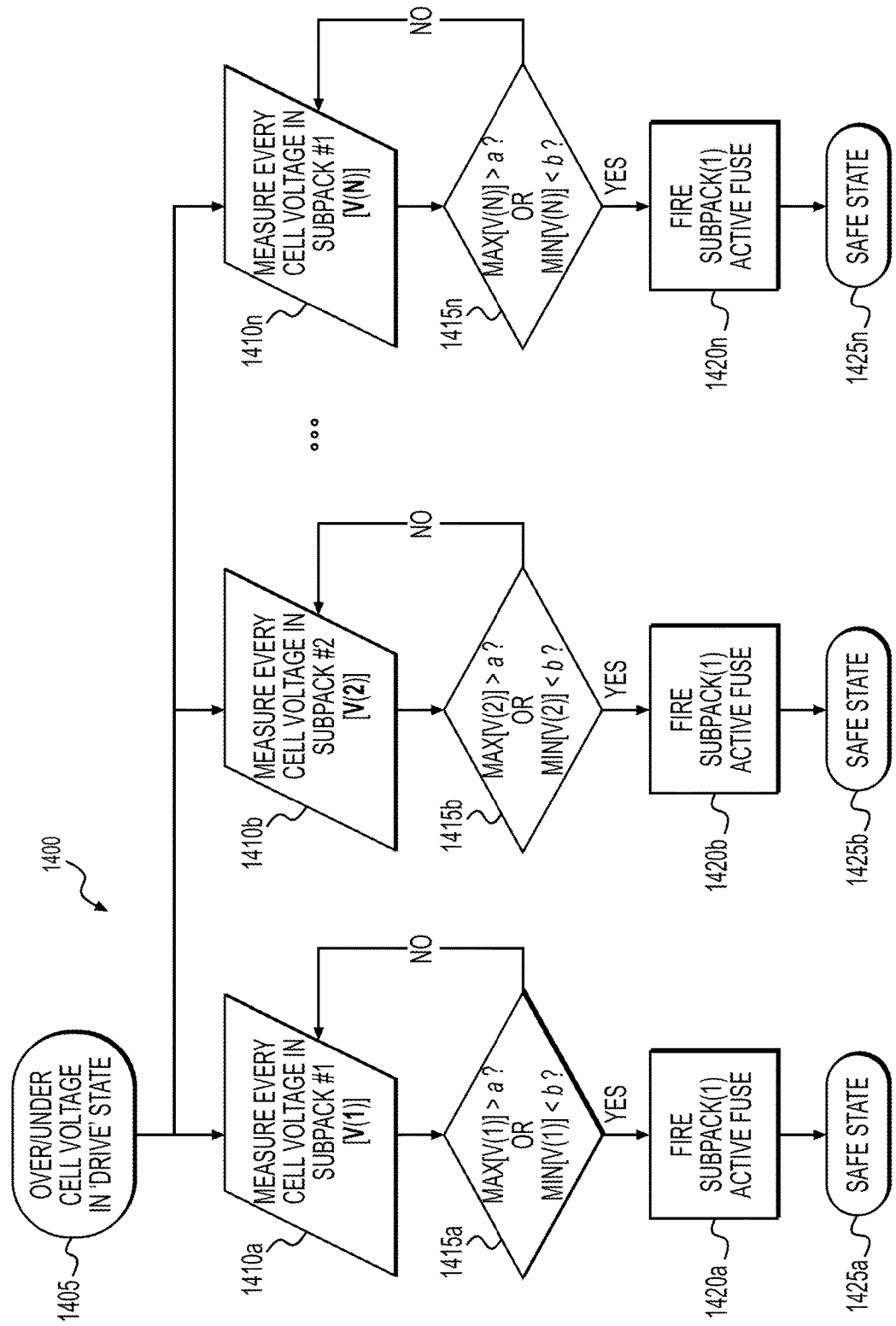
FIG. 14 is a flow chart illustrating an exemplary method of managing battery cell voltage in a drive state according to another embodiment.

FIG. 14 is a flow chart of an exemplary method 1400 using any of the herein described battery systems to manage an over or under voltage condition in a drive state of a vehicle in which the battery system may be positioned. In method 1400, an over or under voltage condition has occurred in the drive state (step 1405). The battery management device 810, the battery management board, and/or pack monitoring chip can measure every cell voltage in respective battery packs (step 1410*a*, 1410*b*, 1410*n*). The battery management device 810, the battery management board, and/or pack monitoring chip may then determine whether the measured cell voltage of respective cells in respective battery packs has exceeded a respective maximum cell voltage threshold and/or is less than a respective minimum cell voltage threshold (step 1415*a*, 1415*b*, 1415*n*). If the measured cell voltage has not exceeded the respective maximum cell voltage threshold and/or is not less than the respective minimum cell voltage threshold, then every cell voltage in respective battery packs continue being measured, as in step 1410*a*, 1410*b*, 1410*n*.

If the measured cell voltage of respective cells in respective battery packs is determined to exceed the respective maximum cell voltage threshold and/or be less than the respective minimum cell voltage threshold, then one or more active fuses of the respective battery pack actuate (e.g., one or more pyro fuses of each battery pack 20) are actuated (step 1420*a*, 1420*b*, 1420*n*). Upon actuating the one or more active fuses of the respective battery pack, then a safe state is considered to be present (step 1425*a*, 1425*b*, 1425*n*) such that no further corrective action by battery management device 810, the battery management board, and/or pack monitoring chip is required.

Figure 15:
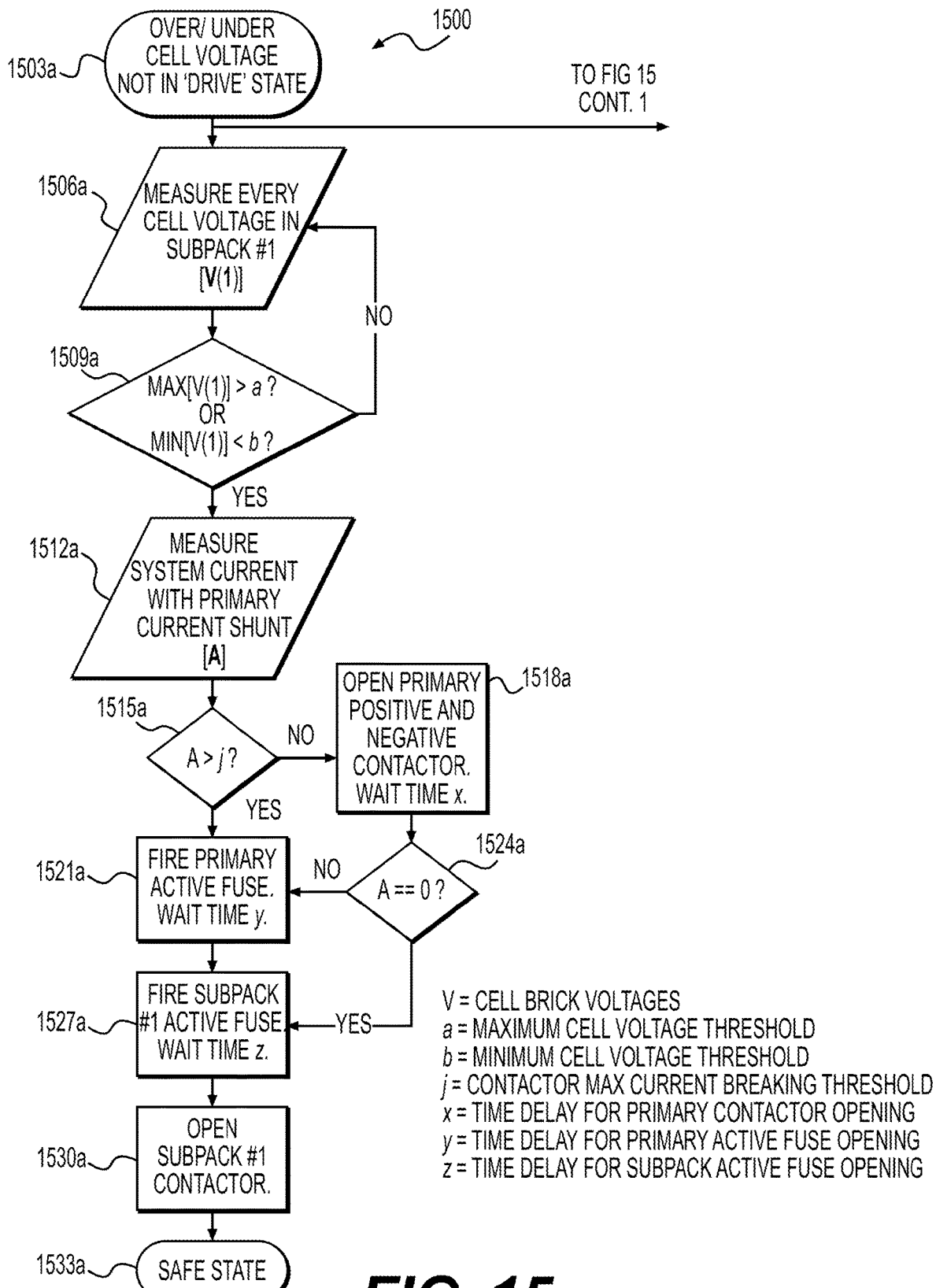
FIG. 15 is a flow chart illustrating an exemplary method of managing battery cell voltage according to another embodiment.

FIG. 15 is a flow chart of an exemplary method 1500 using any of the herein described battery systems to manage an over or under voltage condition when a vehicle is not in a drive state (e.g., when the vehicle is parked, idle, being charged, or otherwise non-operational and/or not moving). In method 1500, the over or under voltage condition has occurred in the non-drive state (step 1503). The battery management device 810, the battery management board, and/or pack monitoring chip can measure every cell voltage in respective battery packs (e.g., the subpacks of step 1506*a*, 1506*b*, 1506*n*). The battery management device 810, the battery management board, and/or pack monitoring chip may then determine whether the measured cell voltage of respective cells in respective battery packs has exceeded a respective maximum cell voltage threshold and/or is less than a respective minimum cell voltage threshold (step 1509*a*, 1509*b*, 1509*n*). If the measured cell voltage has not exceeded the respective maximum cell voltage threshold and/or is not less than the respective minimum cell voltage threshold, then every cell voltage in respective battery packs continue being measured, as in step 1506*a*, 1506*b*, 1506*n*.

If the measured cell voltage of respective cells in respective battery packs is determined to have exceeded the respective maximum cell voltage threshold and/or be less than the respective minimum cell voltage threshold, then system current can be measured with a primary current shunt (step 1512*a*, 1512*b*, 1512*n*). The battery management device 810 may then determine whether the measured system current has exceeded the primary contactor maximum current breaking threshold (step 1515*a*, 1515*b*, 1515*n*). If it has not, the primary positive and/or negative contactor opens and the battery system waits a time delay for the primary contactor to open (step 1518*a*, 1518*b*, 1518*n*). If the measured system current is determined to be zero (step 1524*a*, 1524*b*, 1524*n*), then an active fuse of each battery pack actuates and then waits a time delay for the active fuse of each battery pack to open (step 1527*a*, 1527*b*, 1527*n*).

If the measured system current in step 1515*a*, 1515*b*, 1515*n* has exceeded the primary contactor maximum current breaking threshold, then the primary active fuse (e.g., primary active fuse of battery management device 810) is actuated and then the battery system waits a time delay for the primary active fuse to open (step 1521*a*, 1521*b*, 1521*n*). After step 1521*a*, 1521*b*, 1521*n*, then the active fuse of each battery pack actuates and then wait the time delay for the active fuse of each battery back to open (see previous step 1527*a*, 1527*b*, 1527*n*).

After the time delay for the active fuse of each battery back to open in step 1527*a*, 1527*b*, 1527*n*, a contactor of each battery pack may then open (step 1530*a*, 1530*b*, 1530*n*). Upon opening the contactors in step 1530*a*, 1530*b*, 1530*n*, then a safe state is considered to be present (step 1533*a*, 1533*b*, 1533*n*) such that no further corrective action by battery management device 810 is required.

Figure 16:
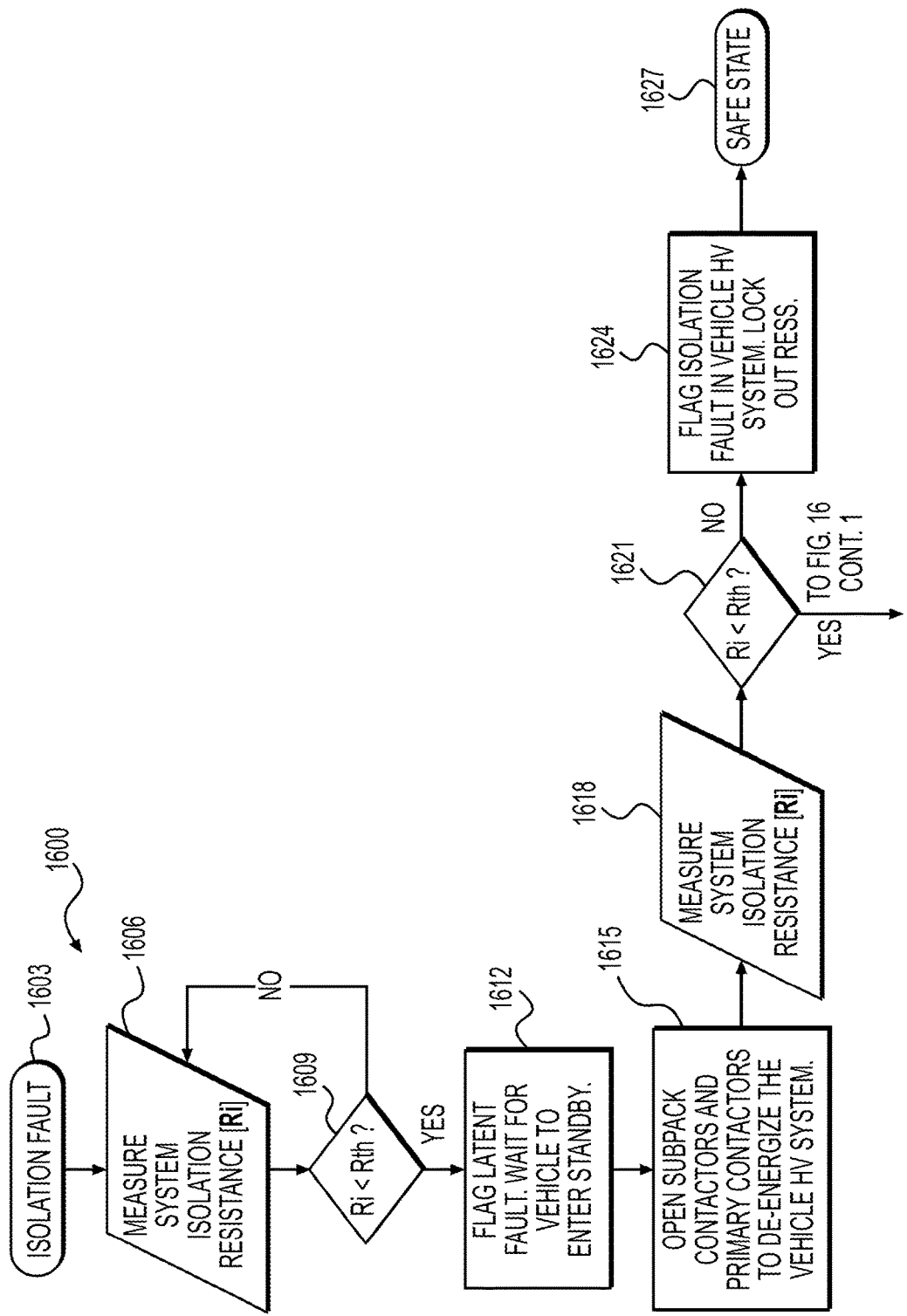
FIG. 16 is a flow chart illustrating an exemplary method of managing an isolation according to another embodiment.

FIG. 16 is a flow chart of an exemplary method 1600 using any of the herein described battery systems to manage an isolation fault event. In method 1600, the isolation fault in the battery system can occur (step 1603). System isolation resistance may then be measured (step 1606). The battery management device 810 may then determine whether the measured system isolation resistance is less than a system minimum isolation resistance fault threshold (step 1609). If it is not less, then the system isolation resistance may continue being measured, as in step 1606.

If the measured system isolation resistance is determined to be less than the system minimum isolation resistance fault threshold, then the isolation fault event is automatically flagged and the system waits for the vehicle to enter a standby mode (step 1612). Contactors of the battery packs and the primary contactors are then opened to de-energize the vehicle HV system (step 1615). After de-energizing the vehicle HV system, the battery system may again measure system isolation resistance (step 1618). Upon measuring the system isolation resistance, the system determines whether the measured system isolation resistance is less than the system minimum isolation resistance fault threshold (step 1621). If it is not less, then the isolation fault event can be automatically flagged in the vehicle HV system causing the battery system to be locked from resuming further use (step 1624). A safe state is then considered to be present (step 1627) such that no further corrective action is required.

If the measured system isolation resistance is less than the system minimum isolation resistance fault threshold, then the battery management device 810 may actuate the active fuse of a first battery pack of the battery packs of the battery system (step 1630). Upon actuating the active fuse of the first battery pack in step 1630, system isolation resistance is again measured (step 1633). The system then determine whether the measured system isolation resistance is less than the system minimum isolation resistance fault threshold (step 1636). If it is not less, then the isolation fault event can be automatically flagged in the first battery pack (step 1639). A safe state is then considered to be present in the first battery pack (step 1642) such that no further corrective action with respect to the first battery pack is required.

If the measured system isolation resistance is less than the system minimum isolation resistance fault threshold after step 1633, then the battery management device 810 may actuate the active fuse of a second battery pack of the battery packs of the battery system (step 1645). Upon actuating the active fuse of the second battery pack, system isolation resistance is again measured (step 1648). The system then determine whether the measured system isolation resistance is less than the system minimum isolation resistance fault threshold (step 1651). If it is not less, then the isolation fault event can be automatically flagged in the second battery pack (step 1654). A safe state is then considered to be present in the second battery pack (step 1657) such that no further corrective action with respect to the second battery pack is required.

If the measured system isolation resistance is less than the system minimum isolation resistance fault threshold after step 1648, then the battery management device 810 may actuate the active fuse of each successive battery pack (e.g., third pack, fourth pack . . . n pack) of the battery packs of the battery system (step 1660). Upon actuating the active fuse of the respective successive battery pack, system isolation resistance is again measured (step 1663). The system then determine whether the measured system isolation resistance is less than the system minimum isolation resistance fault threshold (step 1666). If it is not less, then the isolation fault event can be automatically flagged in the respective successive battery pack (step 1669). A safe state is then considered to be present in the respective successive battery pack (step 1672) such that no further corrective action with respect to the respective successive battery pack is required.

If the measured system isolation resistance is less than the system minimum isolation resistance fault threshold after step 1666, then the battery management device 810 may flag an isolation measurement circuit fault (step 1675). A safe state is then considered to be present (step 1678) such that no further corrective action is required.

Figure 17:
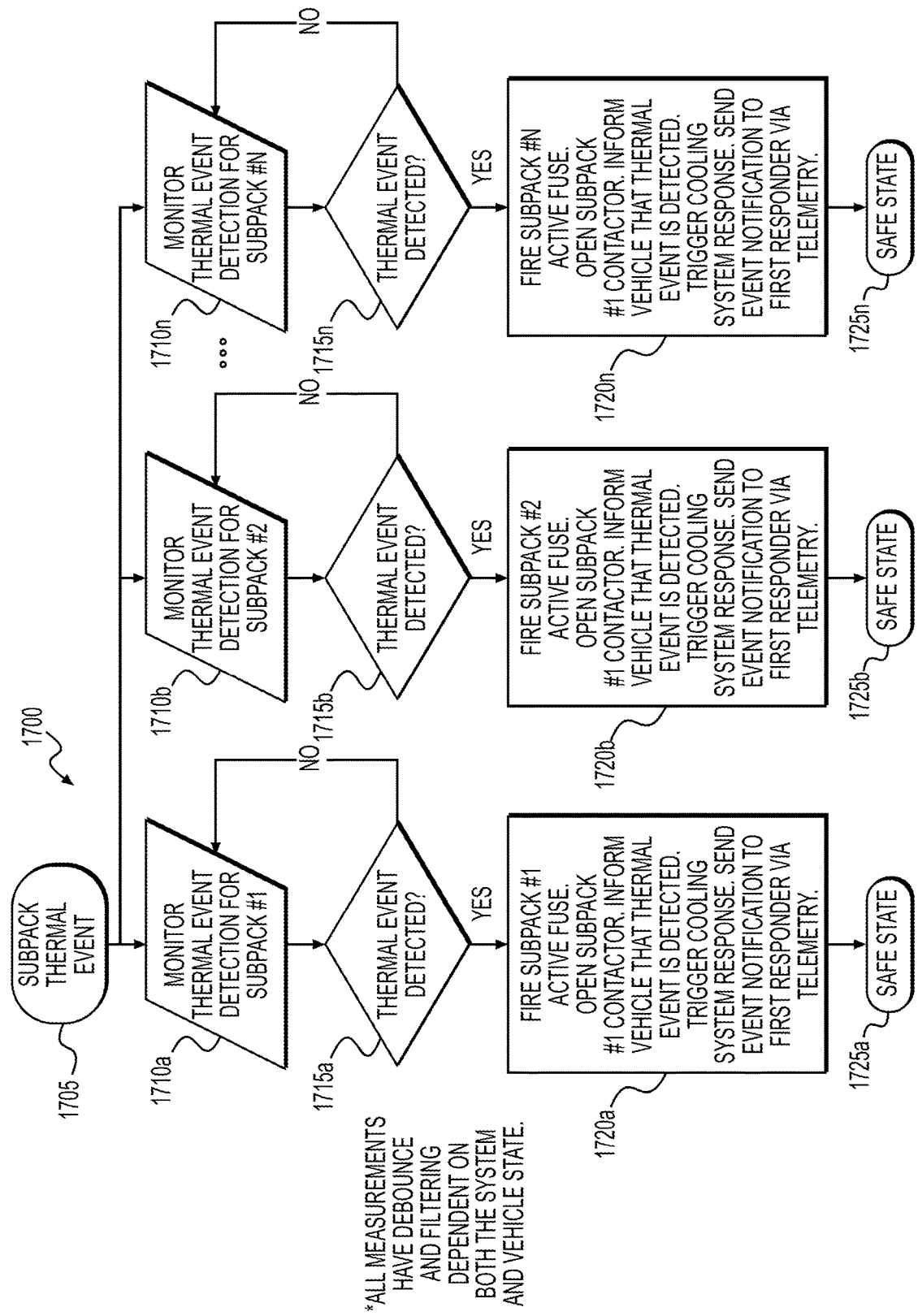
FIG. 17 is a flow chart illustrating an exemplary method of managing a battery subpack thermal event according to another embodiment.

FIG. 17 is a flow chart of an exemplary method 1700 using any of the herein described battery systems to manage a thermal event of a battery pack of the battery system. In method 1700, a thermal event has occurred in one of the battery packs (step 1705). The battery management device 810, the battery management board of the respective battery pack, and/or pack monitoring chip of the respective battery pack can then monitor to detect a thermal event in the respective battery pack (step 1710*a*, 1710*b*, 1710*n*). It is understood that all measurements of method 1700 can include debounce and filtering dependent on the battery system state and/or the vehicle state. The battery system can then determine whether the thermal event has been detected in the respective battery pack (step 1715*a*, 1715*b*, 1715*n*). If the thermal event has not been detected, then battery management device 810, the battery management board of the respective battery pack, and/or pack monitoring chip of the respective battery pack continue monitoring to detect the thermal event in the respective battery pack, as in step 1710*a*, 1710*b*, 1710*n*.

If the thermal event is detected, then one or more of the following correction actions occurs (step 1720*a*, 1720*b*, 1720*n*): one or more active fuses of the respective battery pack (e.g., one or more pyro fuses of each battery pack 20) are actuated, contactors of each respective battery pack are opened, the vehicle is informed that a thermal event has been detected, a cooling response is triggered, a thermal event notification is transmitted to a first responder (e.g., via telemetry), and/or the like. After the one or more corrections of step 1720*a*, 1720*b*, 1720*n* occur, then a safe state is considered to be present (step 1725*a*, 1725*b*, 1725*n*) such that no further corrective action is required.

Figure 18:
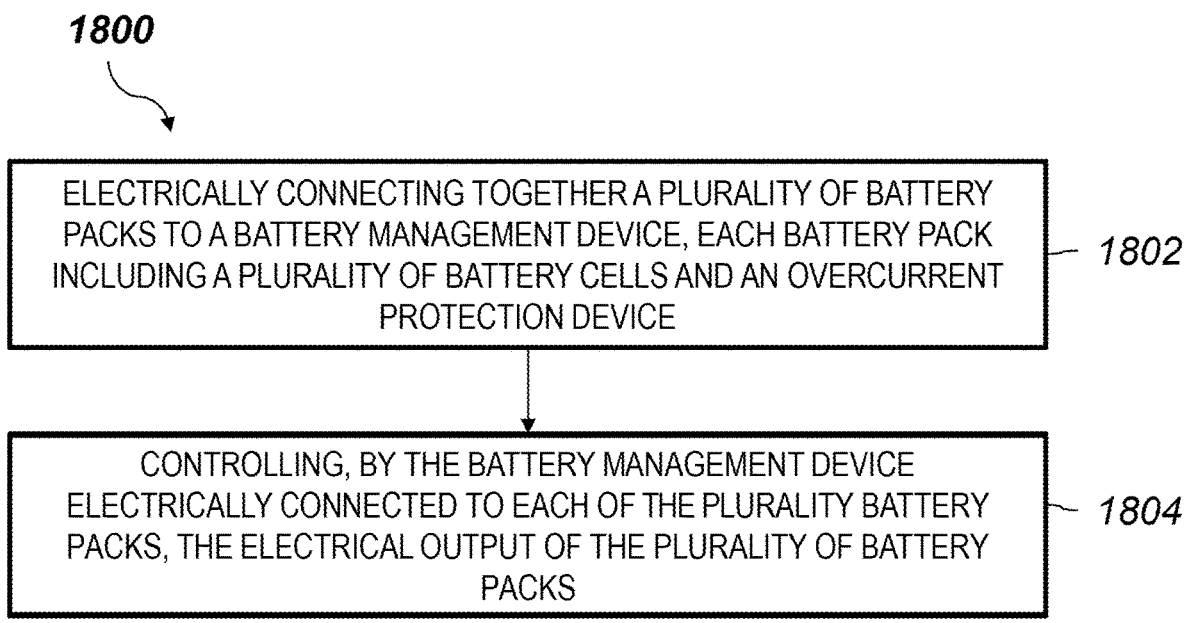
FIG. 18 is a flow diagram of a method of controlling an electrical output of a plurality of battery packs of an electric vehicle, according to this disclosure.

Turning to FIG. 18, an exemplary method 1800 for controlling the electrical output of a plurality of battery packs of an electric vehicle, such as an electric bus, according to an exemplary embodiment. According to one embodiment, the method 1800 includes one or more of the following steps. In step 1802, the method includes electrically connecting together a plurality of battery packs to a battery management device, each battery pack including a plurality of battery cells and an overcurrent protection device. In step 1804, the method includes controlling, by the battery management device electrically connected to each of the plurality battery packs, the electrical output of the plurality of battery packs.

The method 1800 can include connecting in series, in each battery pack, at least 180 individual cells so that a peak system voltage permissible of each battery pack is up to approximately 1000 V.

In some aspects, the method 1800 can include actuating at least one primary active fuse of the battery management device and/or at least one overcurrent protection device of the battery packs in response to an overcurrent event.

In some aspects, the method 1800 can include reducing, by a low-voltage DC/DC converter of the battery management device, a voltage of an electrical output of the plurality of battery packs.

In some aspects, the method 1800 can include determining if a system current has exceeded a contactor maximum current threshold; and protecting, by a primary contactor of the battery management device, all of the plurality of battery packs by opening the primary contactor in response to determining if the system current has exceeded the contactor maximum current threshold.

In some aspects, the method 1800 can include individually regulating, by the battery management device, a voltage of each battery pack and one or more automatic disconnect devices of each battery pack.

In some aspects, the method 1800 can include individually regulating, by the battery management device, pre-charging loads and isolation monitoring in each battery pack.

In some aspects, the method 1800 can include connecting the plurality of battery packs in parallel, and each battery pack comprises a plurality of battery modules connected in series.

In some aspects, the method 1800 can include passively balancing, by the battery management device, each battery pack.

To form a battery pack 20 as shown in in this disclosure, a plurality of battery modules 40 may be arranged such that each battery module 40 is adjacent to at least one other battery module 40 and oriented such that the respective cooling plate 504 are parallel. Each of a pair of trace connectors 508 for each battery module 40 may be connected to circuit board 206 located within circuit housing 202. To form a two-layer battery pack 20 as described herein with respect to FIG. 7B, a second layer of battery modules 40 may be arranged on top of the first layer and similarly connected to circuit board 206. The plurality of battery modules 40 may then be enclosed within housing 208, as shown in FIG. 6. Depending on a particular application or power requirements of the particular application, a plurality of battery packs 20 fabricated as described may be stacked and connected to one or more battery management devices 810, as shown throughout this disclosure.

Each method of this disclosure can respectively include one or more of the previously described steps presented in no particular order. Each method can also include additional steps as would be appreciated and understood by a person of ordinary skill in the art. Battery packs and battery systems disclosed herein may ease the incorporation of batteries into various applications, especially volume-sensitive applications such as vehicular applications. Battery packs configured according to the present disclosure may be significantly thinner than other battery packs, thereby occupying less volume. The thinner configuration of battery packs disclosed herein may further increase design flexibility for vehicles and other machines incorporating battery systems. For example, a vehicle designer need not necessarily allocate a central, high-volume space for a battery system, but rather may distribute the thinner battery packs throughout the vehicle in a less intrusive manner, such as by lining a floor or headliner of the vehicle with battery packs. Additionally, by configuring each battery pack to connect through a single circuit board and electrical connection cable to a centralized battery management device, modularity and flexibility of a battery system can be greatly improved. For example, battery packs may be added or subtracted from any given battery system depending on power needs essentially with plug-and-play effort. Moreover, a number of overall battery cells within battery packs as described herein may be increased or decreased to fit a particular application and power need by adjusting the dimensions of the battery packs. An ability to easily reconfigure a battery pack for different applications using the same base building blocks may increase operational and engineering efficiency while reducing time to market and saving money on validation and capital equipment costs. Accordingly, the herein disclosed battery packs are distributed energy storage packs that can be regulated by a single, central battery management system to provide optimal energy density.

With relatively small and modular battery packs (e.g., at least 40 kWh in some aspects), the herein disclosed systems are configured to serve a variety of commercial vehicle applications (e.g., electric buses, large vehicles, etc). The gravimetric energy density of the disclosed embodiments allows weight sensitive commercial vehicle applications to give back more available payload to the vehicle, while the volumetric energy density allows increased onboard energy to satisfy all the routes and duty cycles.

While principles of the present disclosure are described herein with reference to the battery system of an electric vehicle, it should be understood that the disclosure is not limited thereto. Rather, the systems described herein may be employed in a variety of applications. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A battery system of an electric vehicle, comprising:
a plurality of battery packs, each battery pack comprising a plurality of battery cells enclosed within a housing, each battery pack comprises an active overcurrent protection device; and
a battery management device comprising a primary automatic disconnect device and a primary contactor, the battery management device being electrically connected to each of the battery packs configured to control an electrical output of the plurality of battery packs; and
wherein the primary contactor is configured to protect all of the plurality of battery packs by being opened when a system current has exceeded a contactor maximum current threshold.

2. The battery system of claim 1, wherein the active overcurrent protection device is an active fuse.

3. The battery system of claim 1, wherein each battery pack comprises only one automatic disconnect device.

4. The battery system of claim 1, wherein each battery pack excludes an automatic disconnect device.

5. The battery system of claim 1, wherein the battery management device comprises a low-voltage DC/DC converter configured to reduce a voltage of an electrical output of the plurality of battery packs.

6. The battery system of claim 1, wherein a high-voltage power distribution unit (HVPDU) contains the battery management device, the HVPDU comprising a housing and one or more active fuses, contactors, precharge hardware, current sensors for detecting high voltage loads in the electric vehicle, and wherein the battery management device comprises circuitry and logic for managing all vehicle high voltage and vehicle auxiliary loads, vehicle charging, and current between the battery management device and the battery packs.

7. The battery system of claim 1, wherein each battery pack comprises a voltage range of up to approximately 1000 V.

8. The battery system of claim 1, wherein a thickness of each battery module within each battery pack comprises a thickness ranging from approximately 75 mm to approximately 200 mm.

9. The battery system of claim 1, wherein a thickness of each battery module within each battery pack comprises a thickness less than approximately 100 mm.

10. The battery system of claim 1, wherein each battery pack comprises a cooling plate defining a central plane of a respective battery module, a first battery block adjacent to a first surface of the cooling plate; and a second battery block adjacent to a second surface of the cooling plate, wherein each of the plurality of battery packs is positioned adjacent at least one other of the plurality of battery packs such that the respective cooling plates are parallel.

11. A battery system of an electric vehicle, comprising:
a plurality of battery packs, each battery pack comprising a plurality of battery cells enclosed within a housing, each battery pack comprises an overcurrent protection device and only one automatic disconnect device; and a battery management device comprising a primary automatic disconnect device and a primary contactor, the battery management device being electrically connected to each of the battery packs and configured to control an electrical output of the plurality of battery packs;

wherein the overcurrent protection device and the primary automatic disconnect device are configured to actuate in response to an overcurrent event; and wherein the primary contactor is configured to protect all of the plurality of battery packs by being opened when a system current has exceeded a contactor maximum current threshold.

12. The battery system of claim 11, wherein each battery pack comprises a controller, a battery management board, a plurality of battery cells, and the overcurrent protection device connected in series with the battery cells and the primary automatic disconnect device.

13. The battery system of claim 11, wherein the overcurrent protection device is connected in series with the automatic disconnect device of the battery pack, and the battery management device comprises at least one primary overcurrent protection device, and wherein the overcurrent protection device and the at least one primary overcurrent protection device are configured to actuate in response to an overcurrent event.

14. A method of controlling an electrical output of a plurality of battery packs of an electric vehicle, comprising:

electrically connecting together a plurality of battery packs to a battery management device, each battery pack comprising a plurality of battery cells and an overcurrent protection device;

controlling, by the battery management device electrically connected to each of a plurality battery packs, the electrical output of the plurality of battery packs;

determining if a system current has exceeded a contactor maximum current threshold; and protecting, by a primary contactor of the battery management device, all of the plurality of battery packs by opening the primary contactor in response to determining the system current has exceeded the contactor maximum current threshold.

15. The method of claim 14, further comprising:

actuating at least one primary active fuse of the battery management device and/or at least one overcurrent protection device of the battery packs in response to an overcurrent event.

16. The method of claim 14, further comprising:

reducing, by a low-voltage DC/DC converter of the battery management device, a voltage of an electrical output of the plurality of battery packs.

17. The method of claim 14, further comprising:

individually regulating, by the battery management device, a voltage of each battery pack and one or more automatic disconnect devices of each battery pack.

18. The method of claim 14, wherein each battery pack comprises only one automatic disconnect device.

* * * * *